US012103198B2

(12) United States Patent
Messaros et al.

(10) Patent No.: US 12,103,198 B2
(45) Date of Patent: Oct. 1, 2024

(54) MATERIAL TRIMMING SYSTEM

(71) Applicants: Michael C. Messaros, Erie, CO (US); Shane Vogt, Grand Junction, CO (US); Jonathan C. Fragoso, Thornton, CO (US)

(72) Inventors: Michael C. Messaros, Erie, CO (US); Shane Vogt, Grand Junction, CO (US); Jonathan C. Fragoso, Thornton, CO (US)

(*) Notice: Subject to any disclaimer, the term of this patent is extended or adjusted under 35 U.S.C. 154(b) by 1351 days.

(21) Appl. No.: 16/578,365

(22) Filed: Sep. 22, 2019

(65) Prior Publication Data

US 2020/0101639 A1 Apr. 2, 2020

Related U.S. Application Data

(60) Provisional application No. 62/795,005, filed on Jan. 21, 2019, provisional application No. 62/737,901, filed on Sep. 27, 2018.

(51) Int. Cl.

*B28D 1/00* (2006.01)
*B24B 7/18* (2006.01)
*B28D 1/04* (2006.01)
*B28D 7/02* (2006.01)

(52) U.S. Cl.

CPC ................ *B28D 1/003* (2013.01); *B24B 7/18* (2013.01); *B28D 1/047* (2013.01); *B28D 7/02* (2013.01)

(58) Field of Classification Search

CPC ........... B24B 7/186; B24B 7/18; B28D 1/046; B28D 1/048; B28D 1/047; B28D 1/003
USPC ........................................................ 125/13.01
See application file for complete search history.

(56) References Cited

U.S. PATENT DOCUMENTS

| | | | | |
|---|---|---|---|---|
| 6,116,996 | A * | 9/2000 | Yanase | B24B 23/02 451/508 |
| 7,182,080 | B1 * | 2/2007 | O'Neal | B24B 9/06 451/547 |
| 2005/0250429 | A1 * | 11/2005 | Nomoto | B24D 7/18 451/359 |

* cited by examiner

*Primary Examiner* — Katina N. Henson
(74) *Attorney, Agent, or Firm* — Roger A. Jackson

(57) ABSTRACT

A material trimming system used with a table saw having a rotationally driven arbor, a table with a specialized tray to retain an article to be trimmed, the system including a core structure with a core rotational axis that attaches to the arbor that has an arbor rotational axis. The system also includes a peripheral ring that is about a ring rotational axis, wherein the peripheral ring removably engages the core structure, wherein the peripheral ring includes an outer peripheral element that is operational to trim a material of the article to a selected configuration. In addition, included in the system has a cover having a cover rotational axis, the cover having a mechanism to be removably attachable to the core structure that is operational to removably retain the peripheral ring to the core structure, wherein the arbor, core, ring, and cover rotational axes are all coincident to one another.

8 Claims, 24 Drawing Sheets

MATERIAL TRIMMING SYSTEM

RELATED PATENT APPLICATIONS

This patent application claims the benefit of U.S. provisional patent application Ser. No. 62/737,901 filed on Sep. 27, 2018 by Michael C. Messaros of Erie, Colorado, U.S. and Shane Vogt of Grand Junction Colorado, U.S. and this patent application also claims the benefit of U.S. provisional patent application Ser. No. 62/795,005 filed on Jan. 21, 2019 by Jonathan C. Fragoso of Thornton, Colorado, U.S. and Shane Vogt of Grand Junction Colorado, U.S.

TECHNICAL FIELD

The present invention relates to the field of finishing stone tiles and more particularly relates to an apparatus and method for finishing the edge of stone tiles with a suitable profile prior to installation. The present invention pertains to a modification of heavy duty production tile saws to allow the tile saw to be used for progressive edge profiling, typically called "bull nosing". In another embodiment, the present invention provides a production saw table ridge section which allows the contractor or installer to profile and polish the edges of the tile while compensating for added axial thrust from the bull nosing ring. As the conventional table saw is being used for the more precision work of "bull nosing" a special tray apparatus is fitted to the standard table saw tray that allows for more accurate tray surface X, Y, and Z axis movement and adjustment, further adjustment capability is added to unevenly tilt the tray apparatus slightly to accommodate uneven thickness in the tile.

BACKGROUND OF INVENTION

As indicated above, the present invention pertains to apparatus and method for finishing stone tiles. The term "stone tile" as used includes tiles, various types of stone, including slate, travertine, marble, granite, and similar tiles. Tiles of this type are commonly used to fabricate countertops, tabletops and are applied to various surfaces such as flooring, shower and tub walls, fountains, plus kitchen back splash wall surfaces. Tiles of these types may also be used for interior or exterior building decorative facings, both in residential and commercial construction. Generally when stone of this type is processed, it is first cut at the quarry or at a fabricating location into tiles which are generally square but also may be rectangular. Standard tiles conventionally are 12×12 inches, 16×16 inches, 18×18 inches or, in some cases as large as 24×24 inches or other custom sizes as required. The tiles are cut and generally the exposed surfaces polished. The edges of the tiles may be provided with a slight beveled or profiled edge. At the time of installation, the contractor-installer will cut the tiles using a heavy duty production blade cut-off type tile saw in accordance with the dimensions and geometry of the installation location. As an example, in the case of a countertop, it is generally necessary for the exposed outer edges of the tile to be profiled and finished. One common type of edge fabrication is the bull-nose edge on which the exposed edges are polished and radius rounded for an aesthetically pleasing appearance and for safety to avoid for instance cutting a finger or catching clothing on. Such finishing also eliminates sharp corners and edges which may present a safety hazard especially at the interface of the bull nose radius and the planar tile section which preferably form a smooth surface transition.

The contractor-installer may apply the bull-nose edge using a hand tool such as a heavy duty grinder, generally fitted with a suitable grinding or polishing wheel or pads. A conventional grinder has a motor with a shaft on which an arbor is located. The arbor receives grinding or polishing pads of different types such as diamond pads or pads containing a silicone carbide material. Polishing and profiling of the edge of the tiles is generally accomplished by clamping or securing the tiles in some manner and then manually bringing the abrasive face of the grinder pads into contact with the edge of the tile to be polished. In some cases it is necessary to use a plurality of pads of varying grits to achieve the desired finish. The polishing may be a dry polish or may be a wet polish.

The alternative to on-site finishing, as described above, is for the contractor-installer to determine the dimensions of the tiles that will require profiling and polishing. The contractor can then specify that the production plant provide tiles in accordance with the dimensional specifications. This is obviously a time-consuming and expensive operation not being typically used particularly due to the time delay, especially if the bull nosed tiles come from the factory in the wrong size and have to be sent back for re-work or replacement-thus lending itself to job-site based bull nosing being preferable for time and accuracy reasons of the special edge treatment of the tile.

Further, if the contractor breaks or damages a tile that has been pre-finished, the contractor must either polish the replacement tile by hand or order a replacement from a supplier which further delays the project. In view of this, there exists a need for apparatus and methods for convenient, on job-site profiling and polishing of stone tiles of various types for the most accurate and timely fit-up to the specific tile installation requirements.

The present invention fills a long-felt need and facilitates the fabrication in profiling and edge polishing of stone tiles onsite. In one embodiment, the present invention provides a tile saw table with an elongated ridge section to which a thrust disc wedges against to accommodate the radial and axial force from the uneven forces generated from the outer periphery of the bull nosing ring in cutting, grinding, and polishing one of a margin edge of the tile. Wherein the term "profiling" refers to the application of a polished edge having a certain shape or configuration.

Looking at the prior art in the bull nosing area for tile in U.S. Pat. No. 7,182,080 to O'Neal disclosed are embodiments of tools for finishing stone particularly stone tiles. The first embodiment in O'Neal is a production table on which a plurality of tiles can be secured within a cabinet so a worker may finish and polish the edges of the aligned tiles to produce a desired profile. Further in O'Neal another embodiment of the invention relates to a modification of a standard tile saw in which any auxiliary carriage table is securable to the conveyer. The auxiliary table in O'Neal has an adjustable fence for precisely positioning a tile to be polished wherein the saw blade is replaced with an arbor to which a replaceable polishing ring can be secured by typically a hook and loop fastener. The rings in O'Neal are plastic having an abrasive surface defining various profiles and are provided in various grits and the tile is advanced by the table to bring the edge of the tile into engagement with the periphery of the ring to polish and profile the tile.

Continuing in the prior art in the ceramic and tile cutting area for tile in U.S. Pat. No. 9,962,858 to Chang disclosed is a ceramic and masonry power saw with a motor, a blade, and table with support, a removable tray with coolant passages, further an auxiliary platform and second cooling pan are also added. Chang is presented to represent a current conventional ceramic and masonry saw apparatus.

Further in the prior art in the ceramic and tile cutting area for tile in U.S. Pat. No. 8,469,016 to Plaskett discloses a rotary stone cutting tool and method for making counter tops and the like that includes a shank shaped for detachable connection with a rotary drive. In Plaskett, a cup-shaped cutting blade is mounted on the outer end of the shank, and has a frustoconical sidewall and an outer marginal edge with axially protruding cutting teeth. Further in Plaskett, a plurality of cutting pads are embedded in the sidewall and protrude radially outwardly therefrom and the blade is advanced through a stone slab with the sidewall oriented generally perpendicular to the face of the stone slab to cut an arcuate portion of an inside corner with reduced waste. Plaskett shows apparatus for making corners in ceramic and tile.

Next in the prior art in the corner stone cutting area for tile in United States Patent Application Publication Number 2014/0158107 to Schlough et al., disclosed is a cutting apparatus for cutting corner pieces formed of stone or other materials for use as building faces or for cutting flat pieces is disclosed herein. The cutting apparatus in Schlough includes a frame with a first and a second conveyor operatively attached to the frame and the first and the second conveyors are configured to carry a work piece from a first end of the frame to the second end of the frame. The first conveyor in Schlough is disposed at an angle of about 45 degrees to a ground surface supporting the cutting apparatus, and the second conveyor is disposed at an angle of about 45 degrees to the ground surface supporting the cutting apparatus, wherein the second conveyor is positioned perpendicularly to the first conveyor so as to form a V-shaped channel therewith. The cutting apparatus in Schlough further includes a first cutting blade operatively attached to the frame and positioned generally parallel to the first conveyor and a second cutting blade operatively attached to the frame and positioned generally parallel to the second conveyor. The apparatus in Schlough uses unique cutting table structure to effect a consistent stone corner cut.

What is needed that the present invention provides is a modification to conventional heavy duty production tile saw which allows a tile saw to be used at a job-site for finishing and polishing the edge of a tile. The modification may be provided as an OEM item or an after-market item and includes the elongated ridge section which is securable to the standard tile saw table tray. When the conventional production tile saw is to be used for polishing, the conventional saw blade is removed and replaced with a circular arbor core structure which can be secured to the existing threaded shaft on the conventional tile saw by a nut and lock washer. A removably engagable polishing ring is detachably secured to the face of the core structure. The polishing ring is provided with an outer peripheral polishing surface having a cross sectional configuration in accordance with the shape or profile to be applied to the edge of the tile. The polishing edge of the ring is can be impregnated with a suitable abrasive such as diamond dust or silicone carbide. Preferably the user would be provided with a plurality of polishing rings of various grits from which to select. Often the user will progressively polish the tile beginning with a coarser grit and proceeding to a finer grit.

SUMMARY OF INVENTION

Broadly, the present invention is a material trimming system adapted to attach to a table saw having a rotationally driven arbor, a table, and an article placed on the table to be trimmed, said material trimming system including a core structure that is about a core rotational axis wherein the core structure is adapted to attach to the arbor that is about an arbor rotational axis of the table saw, wherein the core rotational axis and the arbor rotational axis are coincident to one another. Further included in the material trimming system is a peripheral ring that is about a ring rotational axis, wherein the peripheral ring removably engages the core structure, wherein the peripheral ring includes an outer peripheral element that is operational to trim a material of the article to a selected configuration. In addition, included in the material trimming system is a cover having a cover rotational axis, the cover having a mechanism to be removably attachable to the core structure that is operational to removably retain the peripheral ring to the core structure, wherein the core, ring, and cover rotational axes are all coincident to one another.

Also included in the present invention is a tray apparatus adapted to attach to a table saw having a rotationally driven arbor, a table, and an article placed on the tray apparatus, wherein the article is to be trimmed by the table saw, the tray apparatus includes a base planar structure having a first side portion and an opposing second side portion with a Z axis spanning therebetween. Wherein the first side portion is adapted to attach to the table saw table, the base planar structure further includes a first margin and an opposing second margin with a Y axis spanning therebetween, wherein the first margin further includes a fence barrier to operationally help retain the article in the Y axis and the second side operationally providing a support for the article in the Z axis, the base planar structure also further includes a first boundary and an opposing second boundary with a X axis spanning therebetween.

Further included in the tray apparatus is a sliding bridge structure suspended over the second side portion, wherein the sliding bridge structure is slidably engaged to the first and second margins, the sliding bridge structure having a first slidable movement along the X axis, the sliding bridge structure operationally providing a rest for the article in the X axis.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 6 shows view cut 6-6 from FIG. 2, wherein FIG. 6 shows an upper perspective view of a circumferential segment of an inner hoop that details out a rotational engagement, a cantilevered shoulder, distal and proximal ends of the shoulder, a shoulder thinning toward a terminating periphery, and spaced apart apertures therethrough;

FIG. 7 shows cross section view 7-7 from FIG. 2, wherein FIG. 7 shows a cross section of the inner hoop combined with an outer peripheral element, wherein the inner hoop that details out the rotational engagement, the cantilevered shoulder, the distal and proximal ends of the shoulder, the shoulder thinning toward the terminating periphery, and the aperture therethrough with the outer peripheral element with a molding of an outer band therethrough the aperture and also encompassing the shoulder by the outer band;

FIG. 9 shows an assembled version of FIG. 8, wherein FIG. 9 shows the perspective view of the mold cavity that is for the molding of the outer band around the inner hoop (wherein the inner hoop is now out of sight via being encompassed by the outer band second material and the mold cavity), thus the mold cavity is shown along with the spillover prevention ring to help retain the outer band second material toward the terminating periphery (not currently shown in this view) during the molding process;

FIG. 14 is cross sectional view 14-14 from FIG. 13, wherein FIG. 14 shows a detailed fit-up of the locking disc and the outer flange, plus the radially outward positioned pins, and the axial urging movement of the pins as between the locking disc and the outer flange;

FIG. 19 is cross section cut 19-19 from FIG. 18, wherein FIG. 19 shows the first side portion with primarily a third means for coarse adjustment of the second side portion in relation to the first side portion with a threaded rod second wedge cam with an alignment slot, plus a forth means for fine adjustment of the second slidable movement in the form of a jack block assembly with a housing, and jack screw shown;

FIG. 23 is cross section cut 23-23 from FIG. 22, wherein FIG. 23 shows a cross sectional view of the forth means for fine adjustment of the second slidable movement in the form of the jack block assembly that includes the housing, the slide block, return spring, and the affixment for the housing to the first side portion of the base.

REFERENCE NUMBERS IN DRAWINGS

Figure 1:
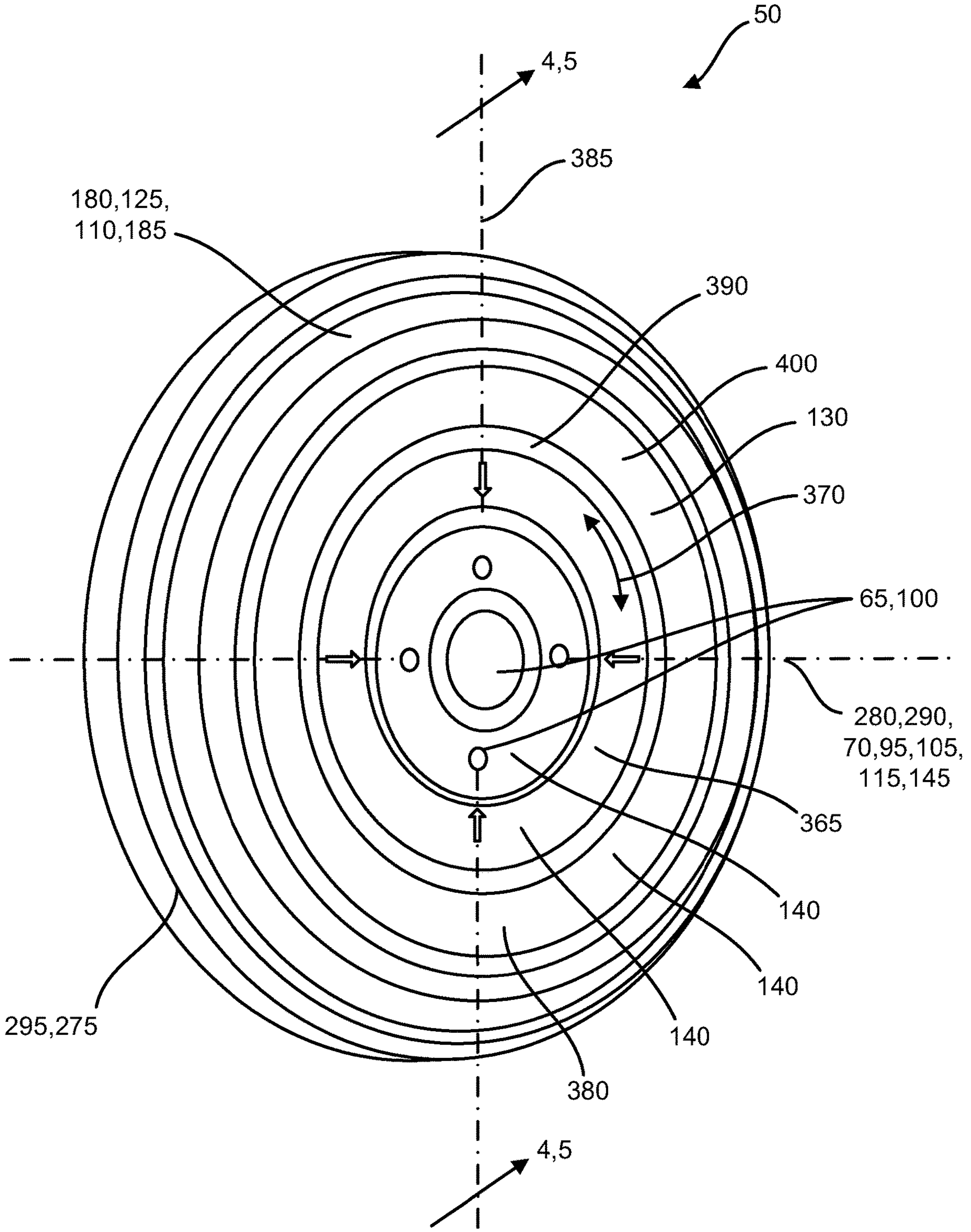
FIG. 1 shows a perspective view of the material trimming system assembled that includes the thrust disc, the core structure, the peripheral ring, and the cover, all being coincidently assembled together about the core rotational axis, the peripheral ring rotational axis, the cover rotational axis and the thrust disc rotational axis are also shown.

50 Material trimming system
55 Table saw
60 Table of the table saw 55
65 Arbor of the table saw 55
70 Arbor 65 rotational axis
75 Article or work piece or tile to be trimmed
80 Trim portion of the article 75
85 Selected configuration of the article 75 trim 80
90 Core structure
95 Core structure 90 rotational axis
100 Core structure 90 adapted to attach to the arbor 65 of the table saw 55
105 Coincident relationship of the core rotational axis 95 and the arbor rotational axis 70
110 Peripheral ring
115 Peripheral ring 110 rotational axis
120 Removable engagement of the peripheral ring 110 to the core structure 90
125 Outer peripheral element of the peripheral ring 110
130 Cover
135 Cover 130 rotational axis
140 Mechanism for removable engagement between the core structure 90 and the cover 130
145 Coincident relationship of the core 95, ring 115, and cover 135 rotational axes
150 Inner hoop of the peripheral ring 110
155 First material of the inner hoop 150
160 Rotational engagement of the inner hoop 150 to the core structure 90
165 Torsional stress loading of the inner hoop 150
170 Rotational stress loading of the inner hoop 150
175 Axial stress loading of the inner hoop 150
180 Outer band of the peripheral ring 110
185 Second material of the outer band 180
190 Cut, grind, and polish of the article 75 by the outer band 180
195 Interface between the first 155 and second 185 materials
200 Cantilevered shoulder of the inner hoop 150
205 Extending radially outward of the cantilevered shoulder 200
210 Terminating peripheral manner of the cantilevered shoulder 200
215 Encompassing of the outer band 180 second material 185 of the cantilevered shoulder 200
220 Inner proximal end portion of the cantilevered shoulder 200
225 Outer distal end portion of the cantilevered shoulder 200
230 Widened cantilever root of the inner proximal end portion 220
235 Extending radially outward of the widened cantilever root 230
240 Thinner terminating distal end portion free end of the outer distal end portion 225
245 Molding of the second material 185 about the cantilevered shoulder 200
250 Aperture of the cantilevered shoulder 200
255 Aperture 250 axis
260 Parallel position of the aperture 250 axis 255 to the peripheral ring 110 rotational axis 115
265 Molding of the second material 185 being disposed therethrough the aperture 250
270 Apertures 250 circumferentially spaced apart in an equidistant manner
275 Thrust disc
280 Thrust disc 275 rotational axis
285 Structural rotational engagement of the thrust disc 275 to the core structure 90
290 Coincident position of the thrust disc 280 and core rotational 95 axes
295 Outer perimeter margin of the thrust disc 275
300 Ridge section that is secured to the table saw 55 table 60
305 Contact of the outer perimeter margin 295 to the ridge section 300
310 Axial thrust force from the thrust disc 275 through the core structure 90 ultimately coming from the peripheral ring 110 from trimming 80 the article 75
315 Thrust disc 275 inclined surface
320 Thrust disc 275 acute angle of the inclined surface 315 to the thrust disc 275 rotational axis 280
325 Outer perimeter margin 295 increasing in distance from the thrust disc rotational axis 280 in moving toward the outer peripheral element 125
330 Inclined surface of the ridge section 300
335 Wedge of the thrust disc 275 inclined surface 315 against the ridge section 300 inclined surface 330
340 Radial force emanating outward from the thrust disc 275 rotational axis 280
345 Ball bearing of the thrust disc 275 structural rotational engagement 285
350 Stepped recess of the core structure 90
355 Receiving cavity disposed within a portion of the stepped recess 350
360 Radial pilot fit of the cover 130 to the stepped recess 350
365 Locking disc
370 Rotatable movable engagement of the locking disc 365 to the core 90
380 Retaining disc
390 Axial urging of the locking disc 365 and the retaining disc 380 apart from one another along the cover 130 rotational axis 135
395 Twist lock engagement of the locking disc 365 being specifically the projection pin 415 into the receiving cavity 355
400 Outer flange of the cover 130
405 Mold cavity for the second material 185 outer band 180
410 Spillover prevention ring for the second material 185 when molding the second material 185
415 Projection pin
420 Receptacle of the projection pin 415
425 High friction surface of the locking disc 365 for helping to manually initiate the rotatable movable engagement 370 of the locking disc 365 to the core 90
430 Spring for creating the urging 390
500 Tray apparatus
505 Base planar structure
510 First side portion of base 505
515 Second side portion of base 505

520 Z axis
525 Adapted to attach of the first side portion 510 to the table saw table 60
530 First margin of base 505
535 Second margin of base 505
540 Y axis
545 Fence barrier of base 505
550 First boundary of base 505
555 Second boundary of base 505
560 X axis
565 Retaining the article 75 in the Y axis 540 by the fence barrier 545
570 Sliding bridge structure
575 Slidable engagement of the sliding bridge structure 570 to the first 530 and second 535 margins
580 First slidable movement
585 Rest for the article 75 in the X axis 560 by the sliding bridge structure 570
590 A first means for coarse adjustment of the first slidable movement 580
595 A second means for fine adjustment of the first slidable movement 580
600 First threaded thumb knob
605 Clamp structure
610 Second thumb knob
615 Threaded rod first wedge cam
620 Plate
625 First guide pin
630 Micro movement along the X axis 560
635 Selectably drawn together of the first wedge cam 615
640 First spring
645 Separating interface
650 Second guide pin
655 A third means for coarse adjustment of the second side portion 515 in relation to the first side portion 510 for the second side portion 515 having a second slidable movement 660 along the Z axis 520
660 A second slidable movement along the Z axis 520
665 A fourth means for fine adjustment of the second slidable movement 660
670 Third thumb knob
675 Threaded rod second wedge cam
680 Alignment slot
685 Selectively drawn together of the second wedge 675
690 Selectively pushed apart of the second wedge 675
695 Jack block assembly
700 Affixment of the jack block assembly 695 to the first side portion 510
705 Slide block of the jack block assembly 695
710 Partial slidable engagement of the slide block to the housing 715
715 Housing of the jack block assembly 695
720 Second spring of the jack block assembly 695
725 Jack screw of the jack block assembly 695
730 Plurality of plateaus
735 Continuous channel
740 Saw cooling fluid

DETAILED DESCRIPTION

With initial reference to FIG. 1, shown is a perspective view of the material trimming system 50 assembled that includes the thrust disc 275, the core structure 90, the peripheral ring 110, and the cover 130, all being coincidently 145, 290 assembled together about the core rotational axis 95, the peripheral ring rotational axis 115, the cover rotational axis 135, and the thrust disc rotational axis 280.

Figure 2:
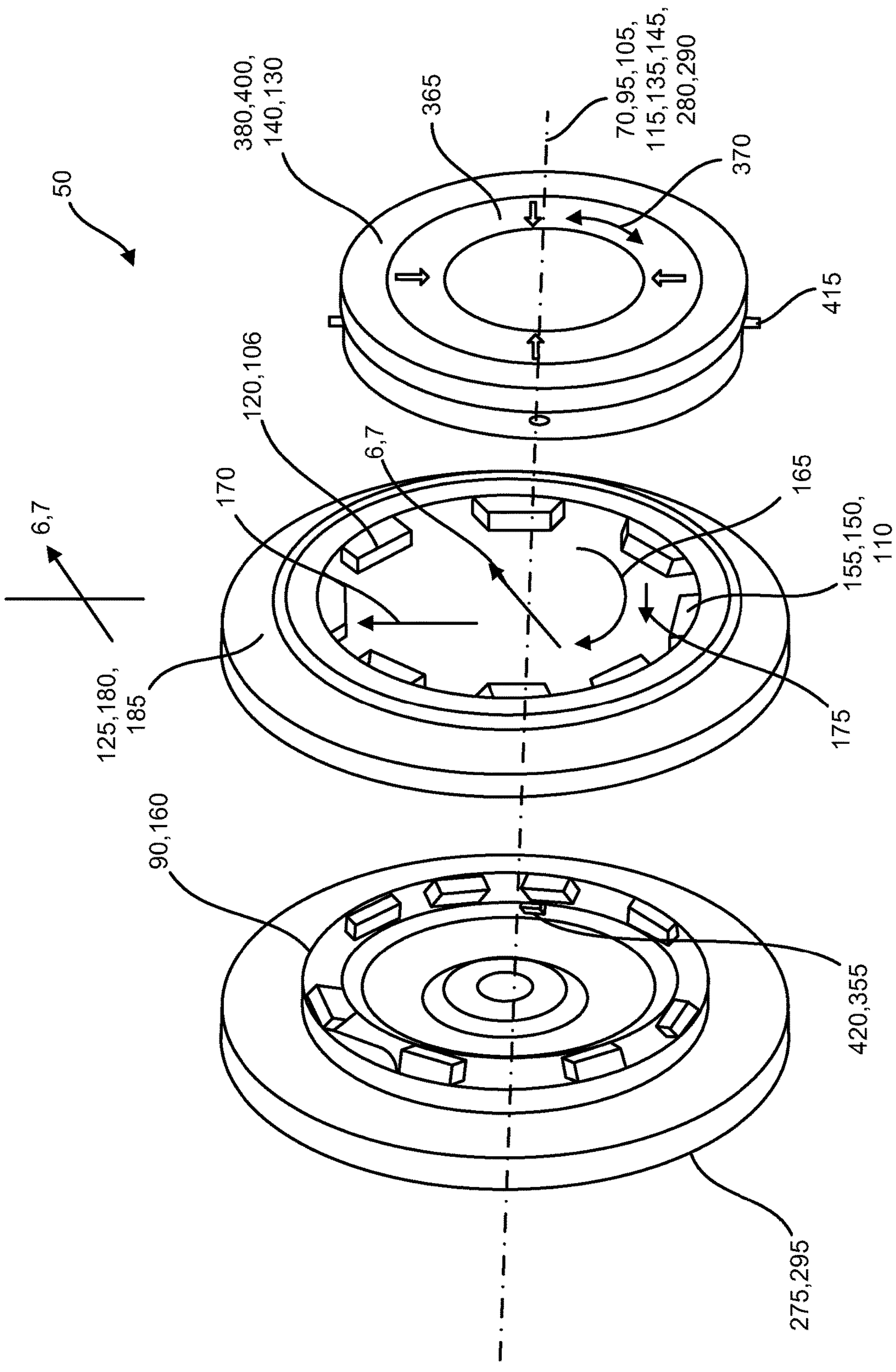
FIG. 2 shows an exploded perspective view of FIG. 1, with FIG. 2 showing the material trimming system apart that includes the thrust disc, the core structure, the peripheral ring, and the cover, all being separately coincidently aligned together about the core rotational axis, the peripheral ring rotational axis, the cover rotational axis and the thrust disc rotational axis are also shown.

Next, FIG. 2 shows an exploded perspective view of FIG. 1, with FIG. 2 showing the material trimming system 50 apart that includes the thrust disc 275, the core structure 90, the peripheral ring 110, and the cover 130, all being separately coincidently 145, 290 aligned together about the core rotational axis 95, the peripheral ring rotational axis 115, the cover rotational axis 135, and the thrust disc rotational axis 280.

Figure 3:
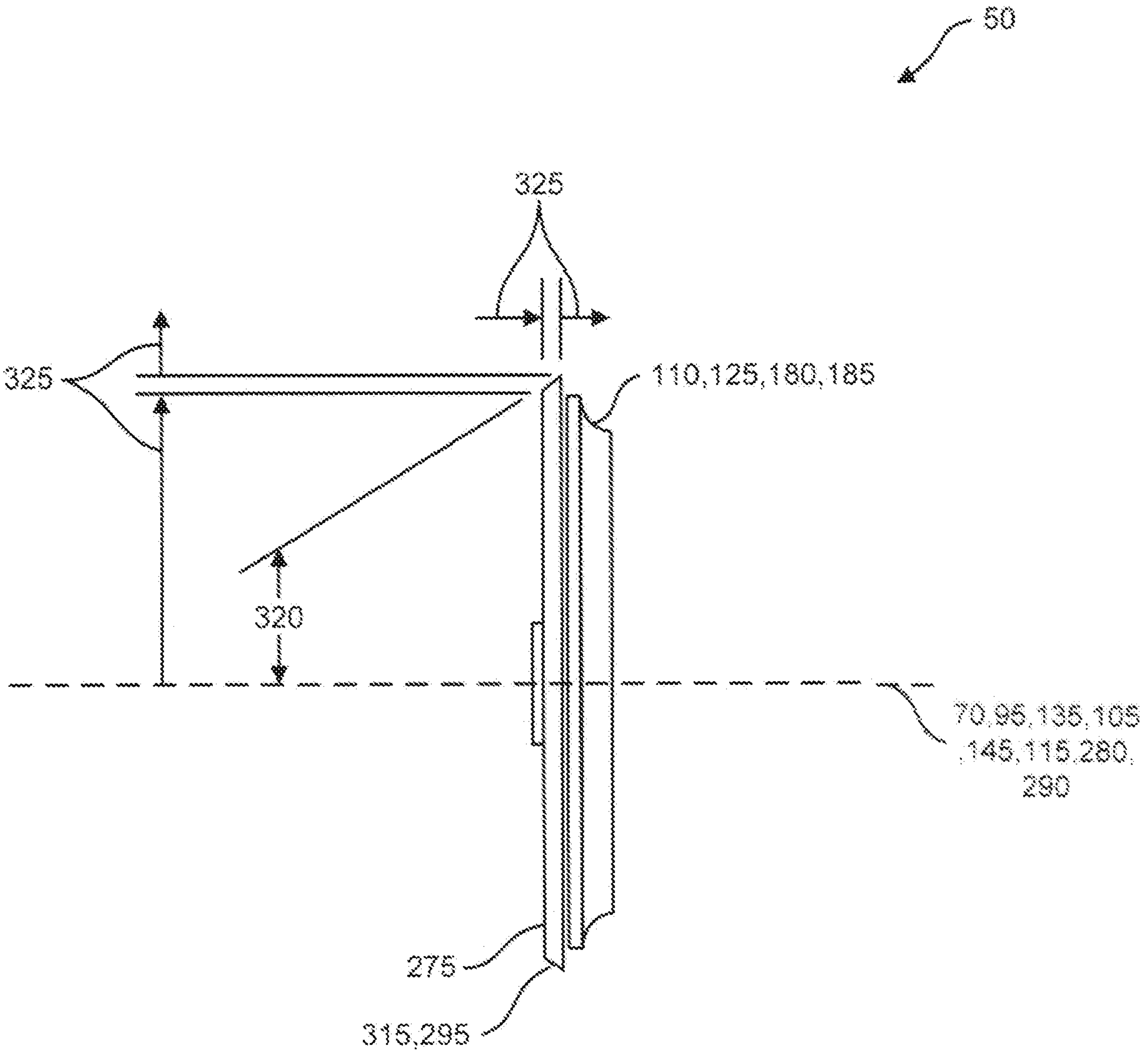
FIG. 3 shows a side elevation view of the material trimming system assembled that includes the thrust disc, the core structure, the peripheral ring, and the cover, all being coincidently assembled together about the core rotational axis, the peripheral ring rotational axis, the cover rotational axis and the thrust disc rotational axis are also shown, further shown is the thrust disc inclined surface and the outer perimeter margins that increase in distance from the thrust disc rotational axis moving toward the outer peripheral element.

Continuing, FIG. 3 shows a side elevation view of the material trimming system 50 assembled that includes the thrust disc 275, the core structure 90, the peripheral ring 110, and the cover 130, all being coincidently 145, 290 assembled together about the core rotational axis 95, the peripheral ring rotational axis 115, the cover rotational axis 135, and the thrust disc rotational axis 280. Further shown in FIG. 3 is the thrust disc 275 inclined surface 315 and the outer perimeter margins 295 that angularly 320 increase 325 in distance from the thrust disc rotational axis 280 moving toward the outer peripheral element 125.

Figure 4:
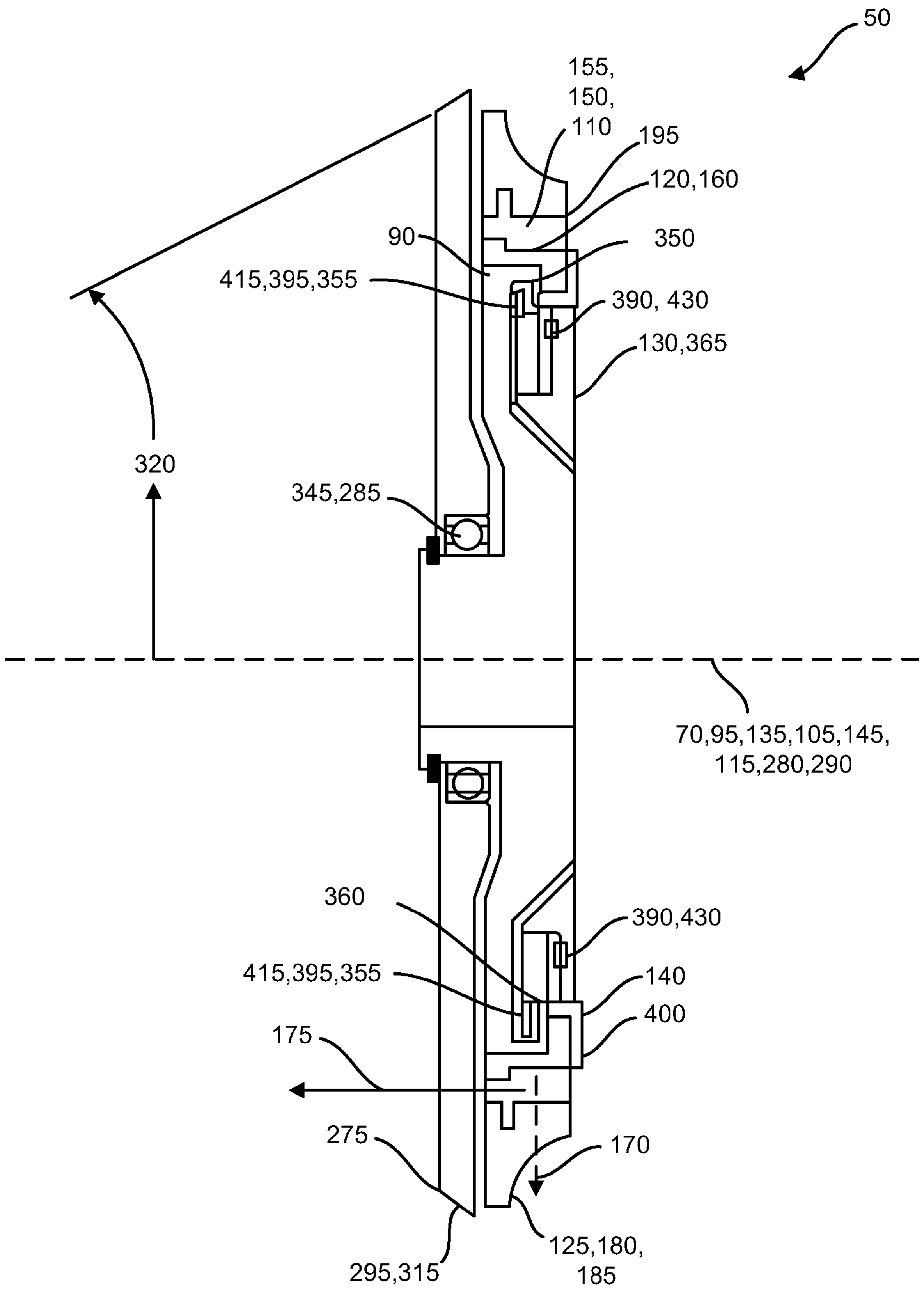
FIG. 4 shows cross section cut 4-4 from FIG. 1, with FIG. 4 showing the internal detail of the material trimming system assembled that includes the thrust disc, the core structure, the peripheral ring, and the cover, all being coincidently assembled together about the core rotational axis, the peripheral ring rotational axis, the cover rotational axis and the thrust disc rotational axis are also shown, further shown is the thrust disc inclined surface angle of the outer perimeter margin, plus the positional nature of rotational and axial stresses on the inner hoop.

Further, FIG. 4 shows cross section cut 4-4 from FIG. 1, with FIG. 4 showing the internal detail of the material trimming system 50 assembled that includes the thrust disc 275, the core structure 90, the peripheral ring 110, and the cover 130, all being coincidently 145, 290 assembled together about the core rotational axis 95, the peripheral ring rotational axis 115, the cover rotational axis 135, and the thrust disc rotational axis 280. Further shown in FIG. 4 is the thrust disc 275 inclined surface angle 320 of the outer perimeter margin 325, plus the positional nature of rotational 170 and axial 175 stresses on the inner hoop 150.

Figure 5:
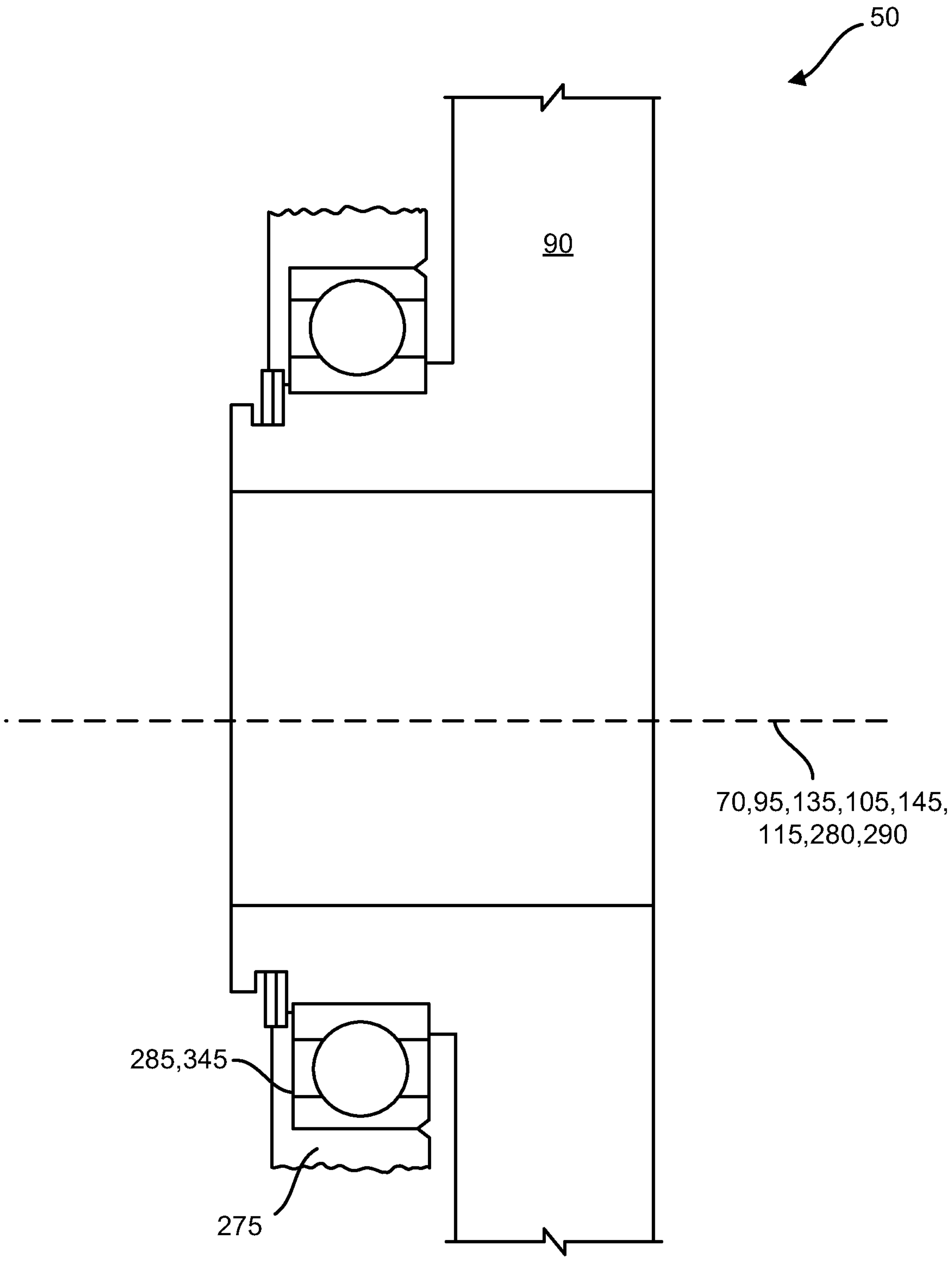
FIG. 5 shows cross section cut 5-5 from FIG. 1, with FIG. 5 showing an expanded internal detail of the material trimming system assembled that includes the thrust disc, the core structure, and the cover, all being coincidently assembled together about the core rotational axis, the cover rotational axis, and the thrust disc rotational axis that are shown, further shown is the thrust disc ball bearing.

Moving onward, FIG. 5 shows cross section cut 5-5 from FIG. 1, with FIG. 5 showing an expanded internal detail of the material trimming system 50 assembled that includes the thrust disc 275, the core structure 90, and the cover 130, all being coincidently 145, 290 assembled together about the core rotational axis 95, the cover rotational axis 135, and the thrust disc rotational axis 280, further shown is the thrust disc 275 ball bearing 345.

Figure 6:
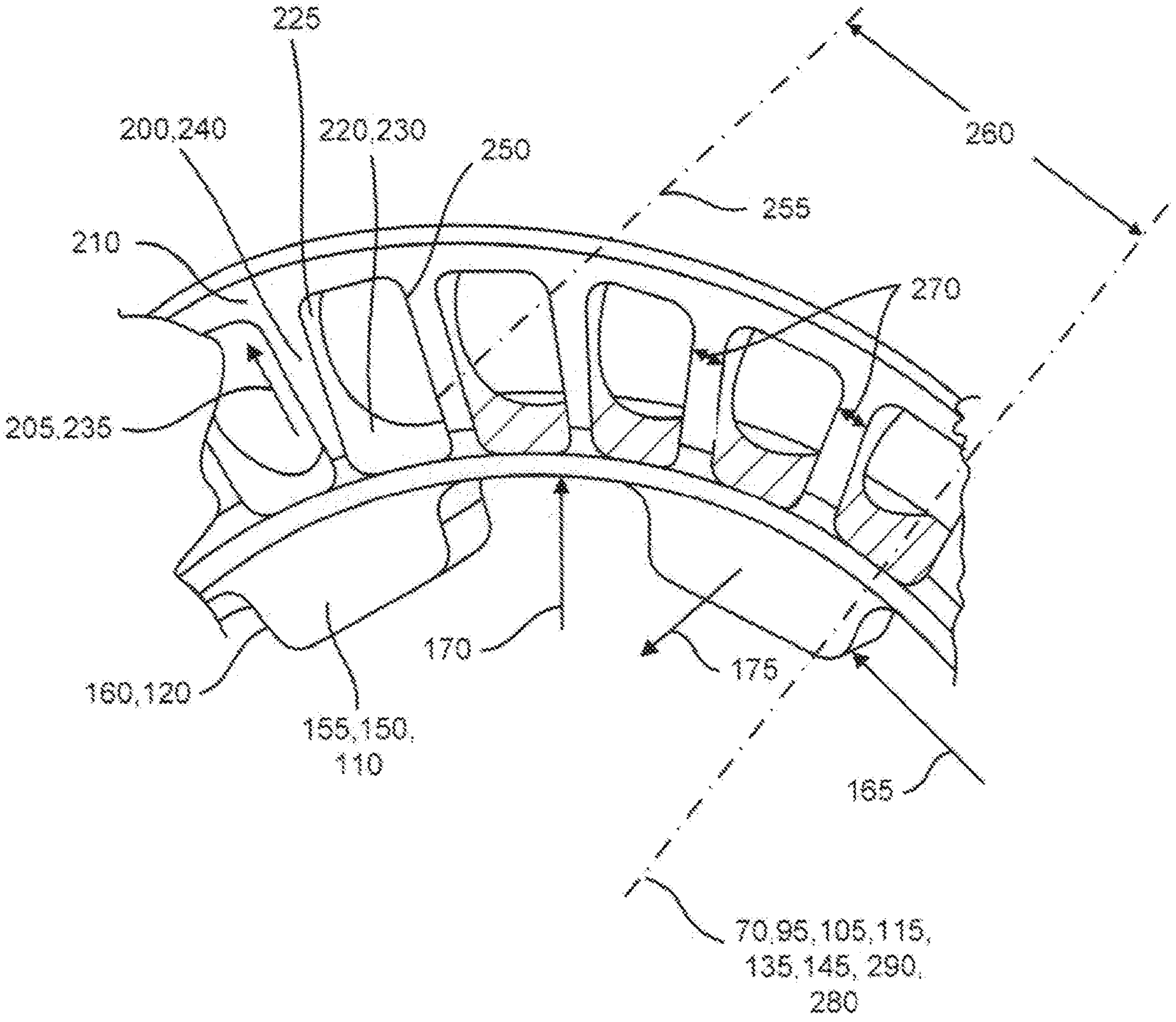

Next, FIG. 6 shows view cut 6-6 from FIG. 2, wherein FIG. 6 shows an upper perspective view of a circumferential segment of the inner hoop 150 that details out the rotational engagement 160, the cantilevered shoulder 200, distal 225 and proximal 220 ends of the shoulder 200, a shoulder thinning 240 toward the terminating periphery 210, and spaced apart 270 apertures 250 therethrough the shoulder 200.

Figure 7:
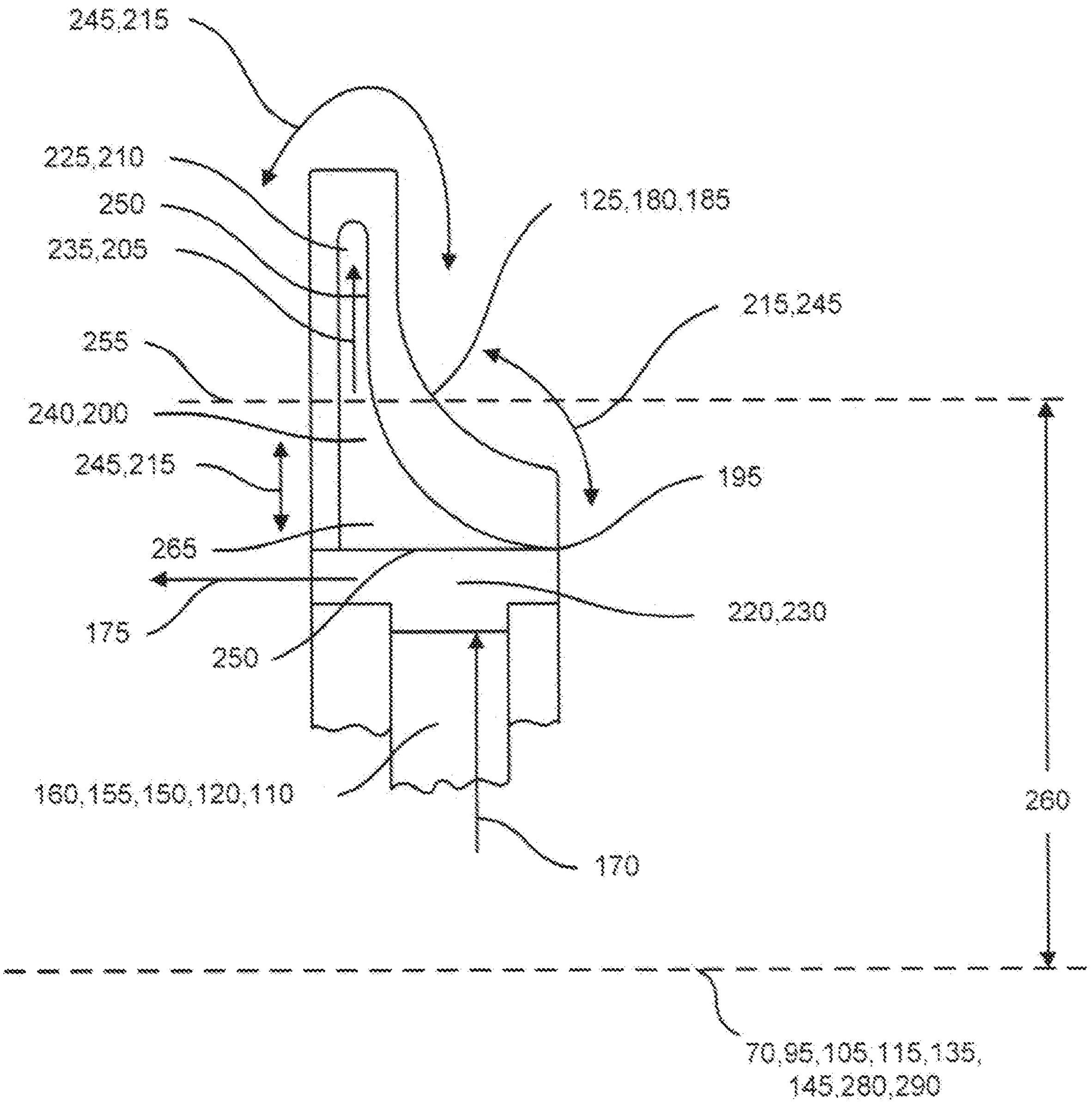

Continuing, FIG. 7 shows cross section view 7-7 from FIG. 2, wherein FIG. 7 shows a cross section of the inner hoop 150 combined with the outer peripheral element 125, wherein the inner hoop 150 that details out the rotational engagement 160, the cantilevered shoulder 200, the distal 225 and proximal 220 ends of the shoulder 200, the shoulder 200 thinning 240 toward the terminating periphery 210, and the aperture 250 therethrough with the outer peripheral element 125. Also FIG. 7 shows a molding 245 of an outer band 180 therethrough 265 the aperture 250 and also encompassing 215 the shoulder 200 by the outer band 180.

Figure 8:
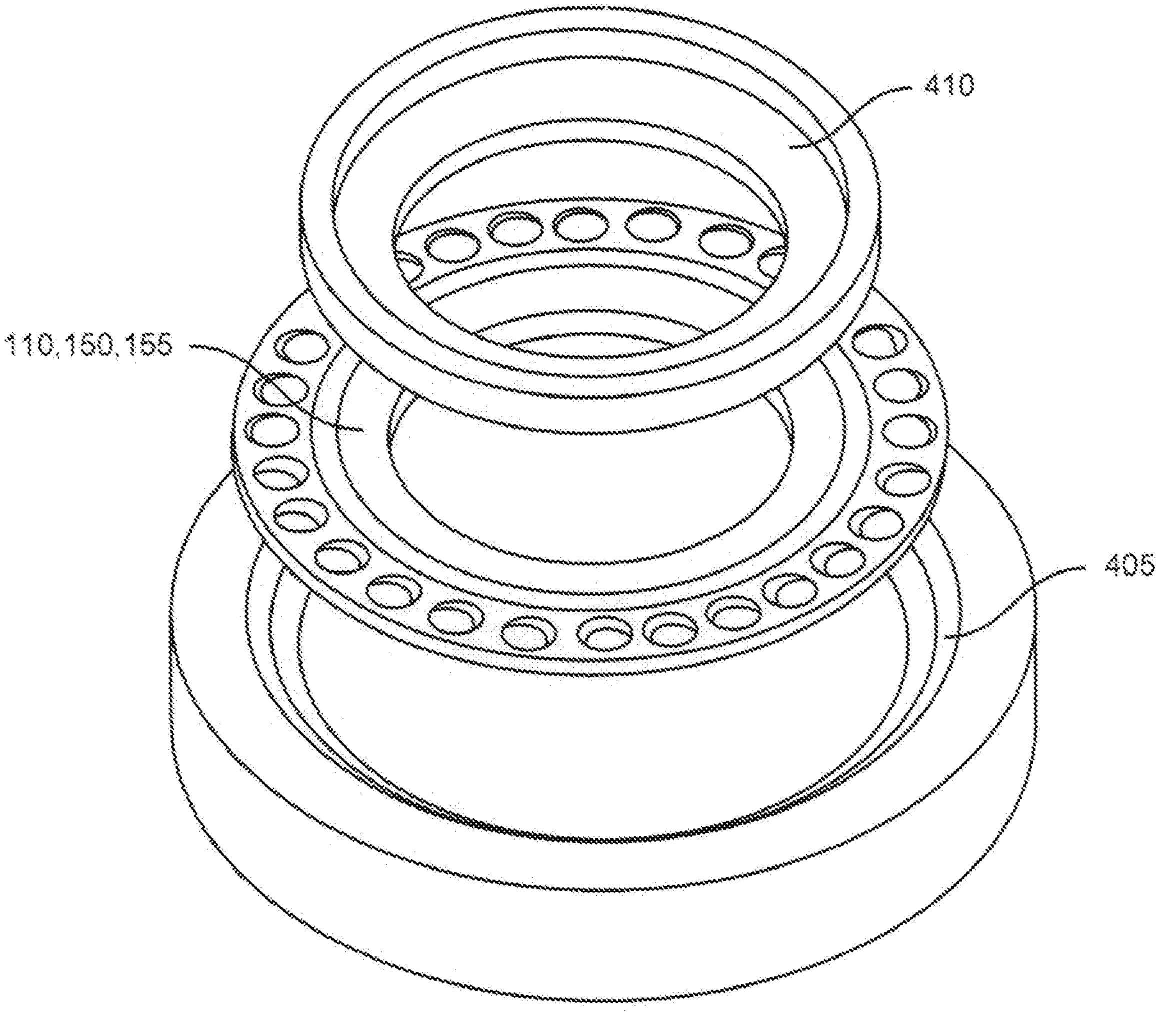
FIG. 8 shows an exploded perspective view of the mold cavity that is for the molding of the outer band around the inner hoop, thus the mold cavity is shown along with the inner hoop and a spillover prevention ring to help retain the outer band second material toward the terminating periphery during the molding process.

Moving onward FIG. 8 shows an exploded perspective view of the mold cavity 405 that is for the molding of the outer band 180 around the inner hoop 150, thus the mold cavity 405 is shown along with the inner hoop 150 and a spillover prevention ring 410 to help retain the outer band 180 second material 185 toward the terminating periphery 210 during the molding process.

Figure 9:
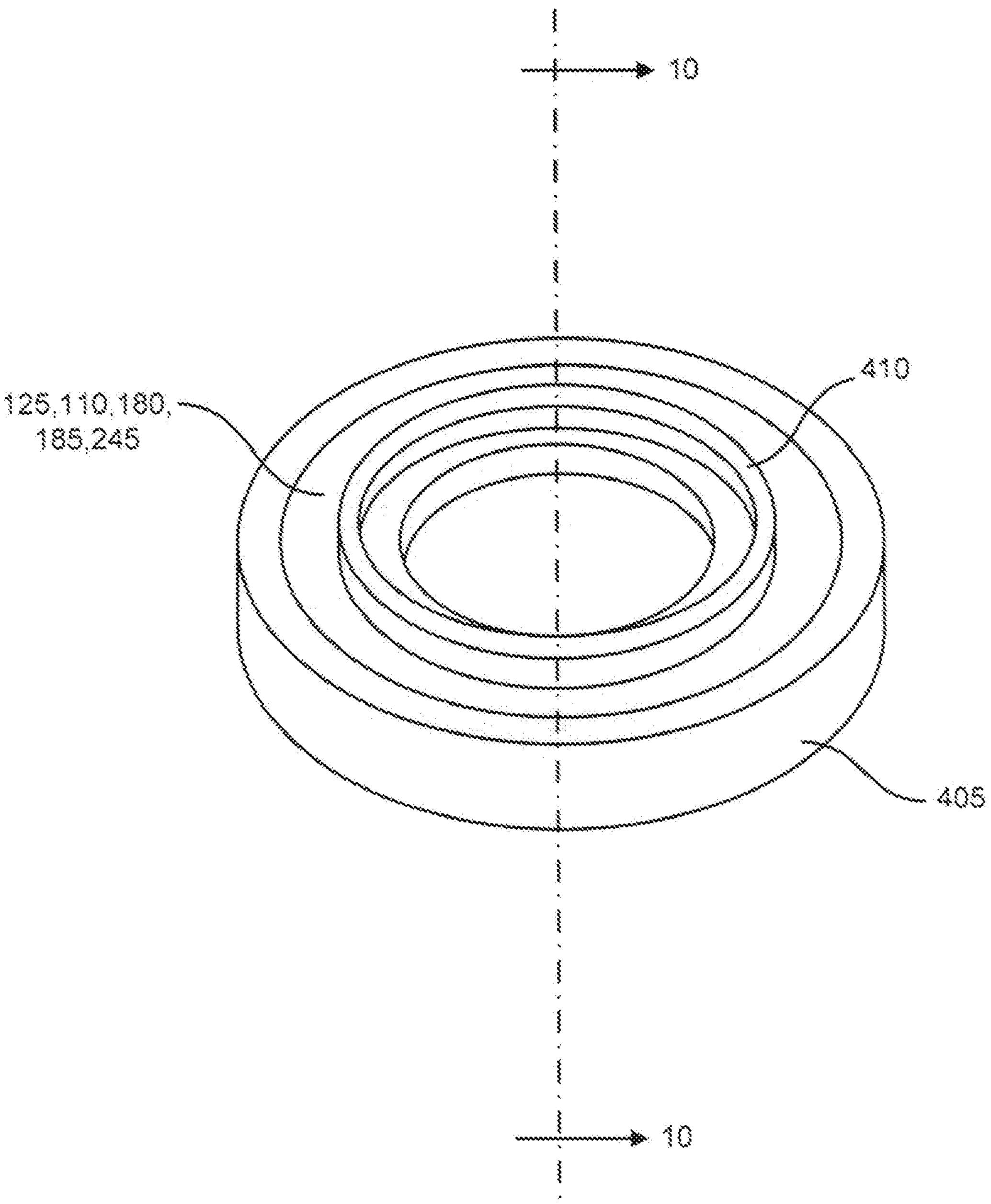

Next, FIG. 9 shows an assembled version of FIG. 8, wherein FIG. 9 shows the perspective view of the mold cavity 405 that is for the molding of the outer band 180 around the inner hoop 150 (wherein the inner hoop 150 is now out of sight via being encompassed 215 by the outer band 180 second material 185 and the mold cavity 405). Thus in FIG. 9 the mold cavity 405 is shown along with the spillover prevention ring 410 to help retain the outer band 180 second material 185 toward the terminating periphery 210 (not currently shown in this view) during the molding process of the outer band 180 to the inner hoop 150, also as shown in FIG. 7.

Figure 10:
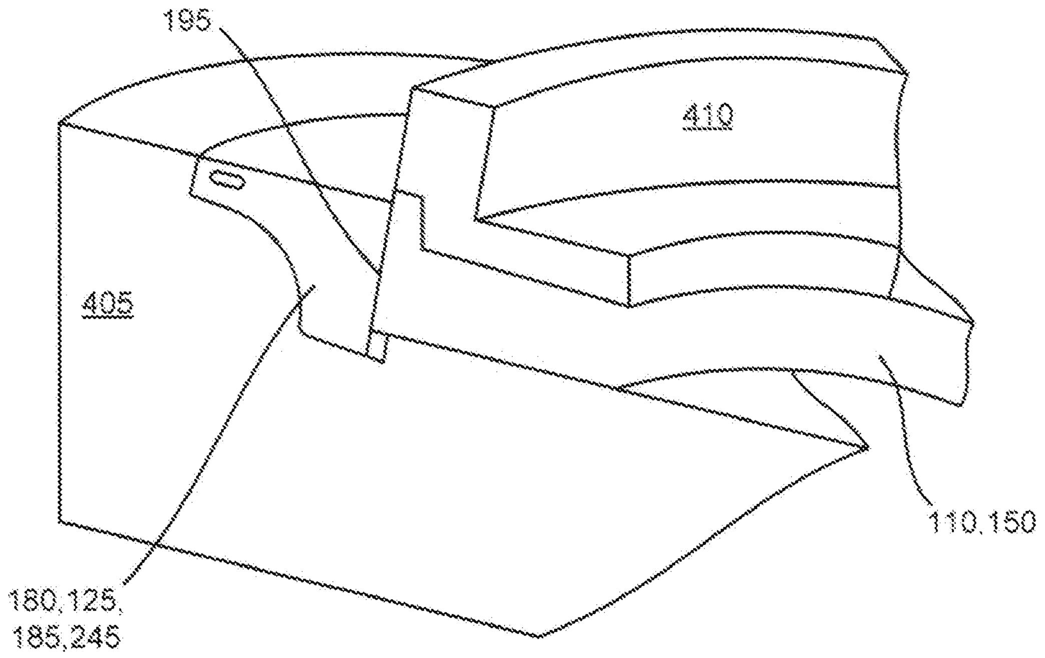
FIG. 10 shows cross section 10-10 from FIG. 9, such that FIG. 10 shows the cross sectional positional orientation of the assembled mold cavity, the inner hoop, the outer band second material, and the spillover prevention ring.

Further, FIG. 10 shows cross section 10-10 from FIG. 9, such that FIG. 10 shows the cross sectional positional orientation of the assembled mold cavity 405, the inner hoop 150, the outer band 180 second material 185, and the spillover prevention ring 410.

Figure 11:
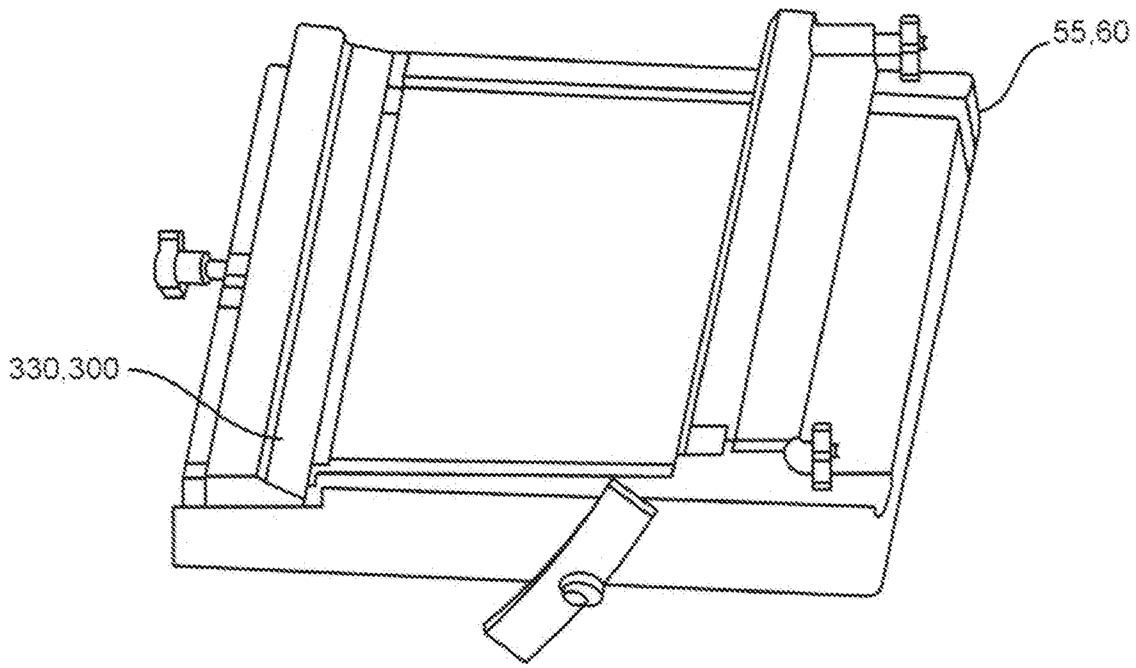
FIG. 11 shows an upper perspective view of the saw table that uses conventional stops to hold the article, however, also shown is a ridge section with a inclined surface that is secured to the table, wherein the inclined surface has a wedge interface with the thrust disc inclined surface.

Moving ahead, FIG. 11 shows an upper perspective view of the saw 55 table 60 that uses conventional stops to hold the article 75, however, also shown is a ridge section 300 with an inclined surface 330 that is secured to the table 60, wherein the inclined surface 330 has a wedge interface 305 with the thrust disc 275 inclined surface 330.

Figure 12:
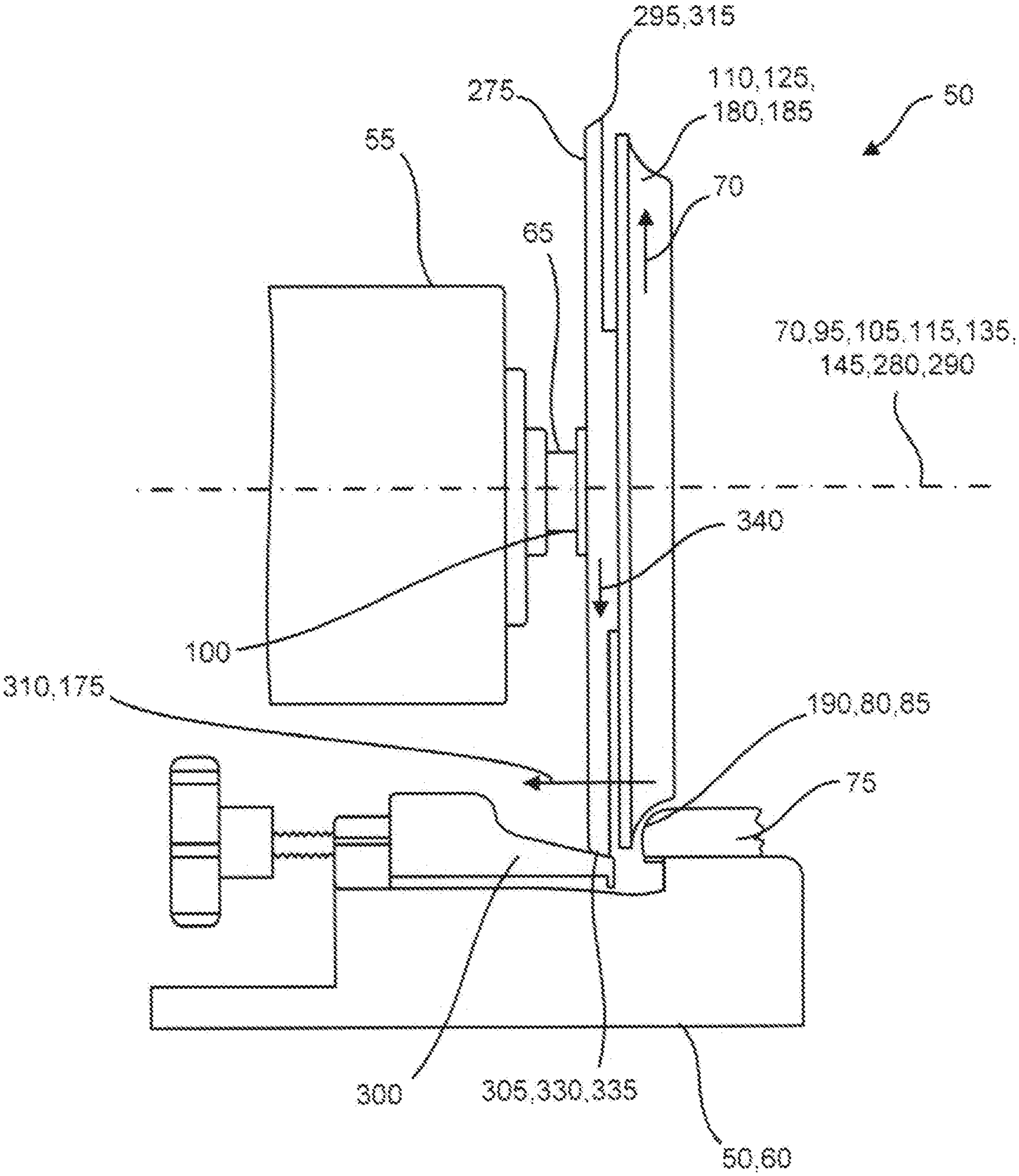
FIG. 12 shows a side elevation view of the material trimming system in use that shows the table saw, the table, the ridge section, the inclined surface of the ridge section, the wedge of the thrust disc contacting the inclined surface of the ridge section to accommodate thrust force as axial stress from the inner hoop that comes from the outer band cutting, grinding, and polishing the article on the table, wherein the other forces being radial and rotational also being shown.

Continuing, FIG. 12 shows a side elevation view of the material trimming system 50 in use that shows the table saw 55, the table 60, the ridge section 300, the inclined surface 330 of the ridge section 300, and the wedge of the thrust disc 275 contacting 335 the inclined surface 330 of the ridge section 300 to accommodate thrust force 175, 310. FIG. 12 also shows axial stress from the inner hoop 150 that comes from the outer band 180 cutting, grinding, and polishing 190 the article 75 on the table 60, wherein the other forces being radial 340 and rotational 170 being shown.

Figure 13:
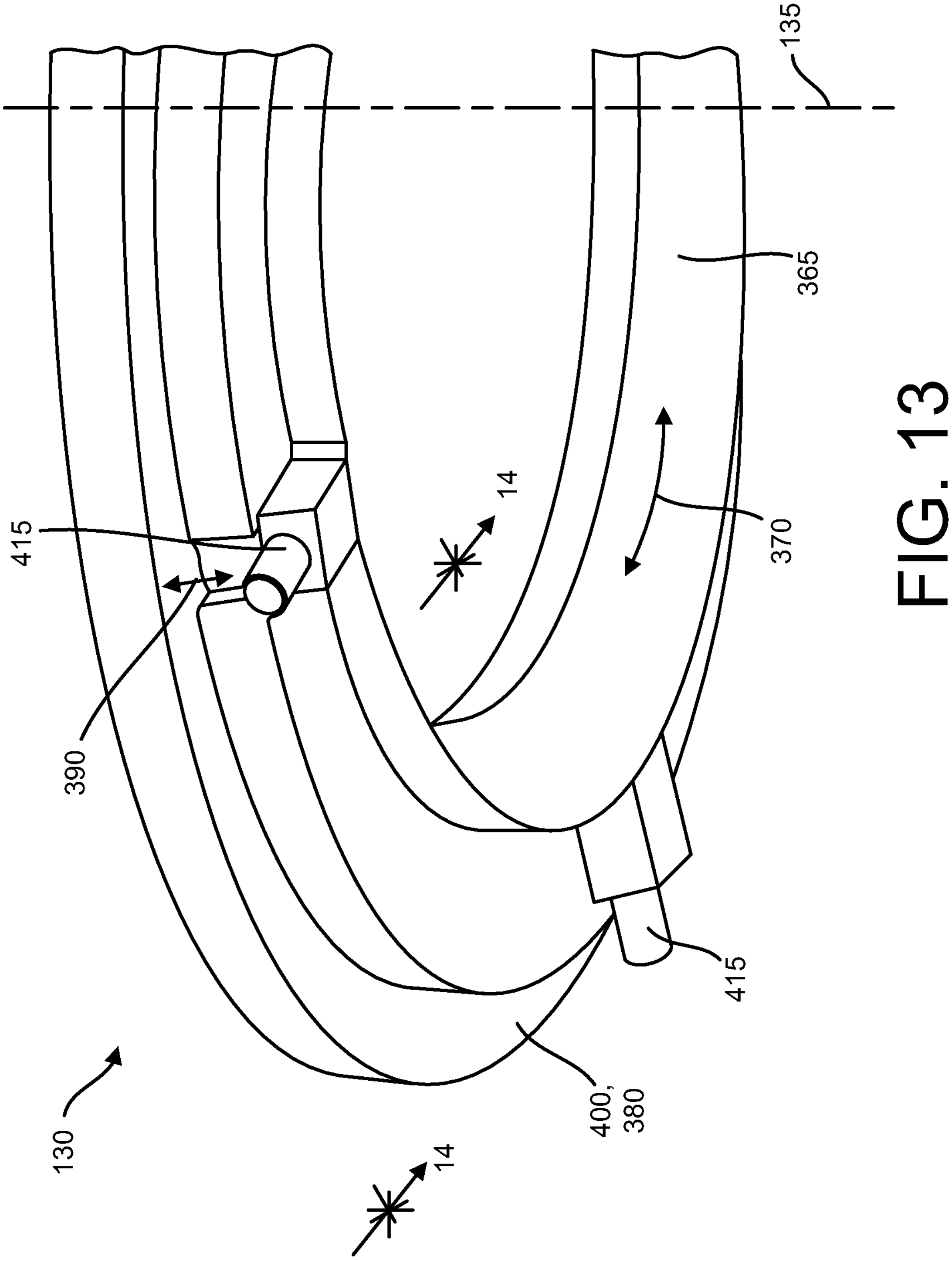
FIG. 13 shows an expanded perspective view of the cover that includes the locking disc and the outer flange, plus the radially outward positioned pins, and the axial urging movement of the pins as between the locking disc and the outer flange.

Next, FIG. 13 shows an expanded perspective view of the cover 130 that includes the locking disc 365 and the outer flange 400, plus the radially outward positioned pins 415, and the axial urging movement 390 of the pins 415 as between the locking disc 365 and the outer flange 400.

Figure 14:
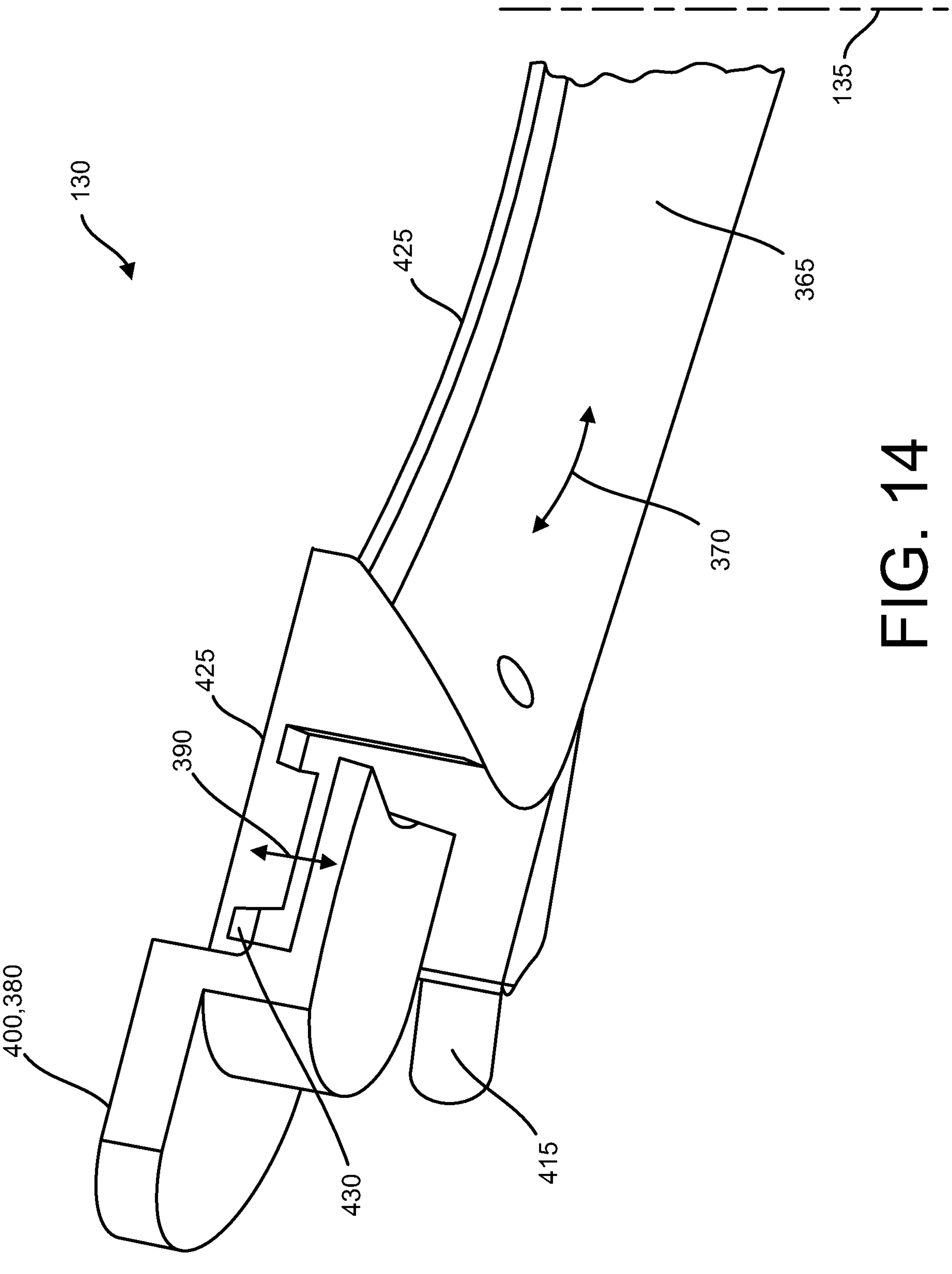

Further, FIG. 14 is cross sectional view 14-14 from FIG. 13, wherein FIG. 14 shows a detailed fit-up of the locking disc 365 and the outer flange 400, plus the radially outward positioned pins 415, and the axial urging movement 390 of the pins 415 as between the locking disc 365 and the outer flange 400.

Figure 15:
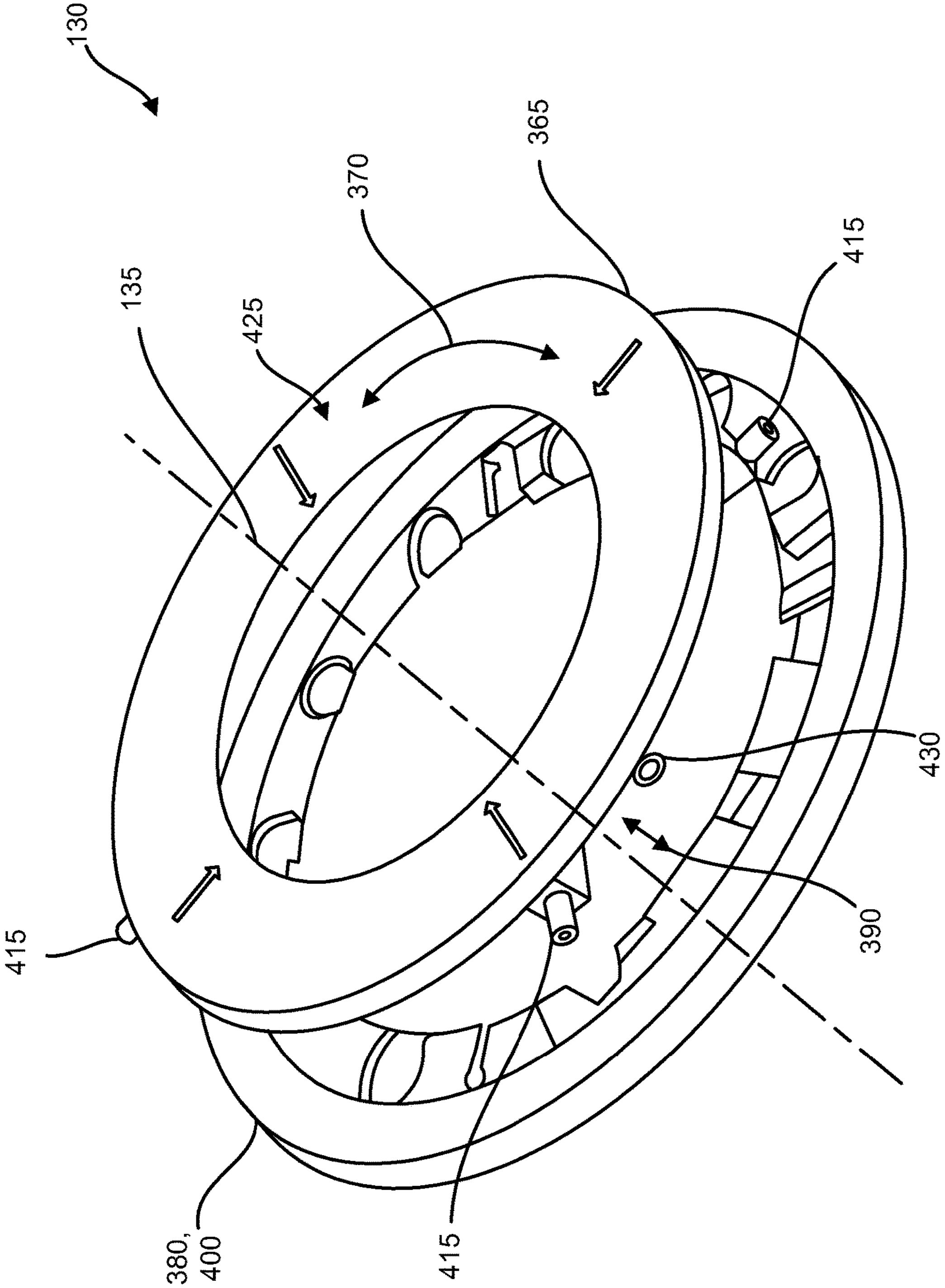
FIG. 15 shows an exploded perspective view of the locking disc and the outer flange, plus the radially outward positioned pins, and the axial urging movement of the pins as between the locking disc and the outer flange as preferably shown as a spring.

Continuing, FIG. 15 shows an exploded perspective view of the locking disc 365 and the outer flange 400, plus the radially outward positioned pins 415, and the axial urging movement 390 of the pins 415 as between the locking disc 365 and the outer flange 400 as preferably shown as a spring 430.

Figure 16:
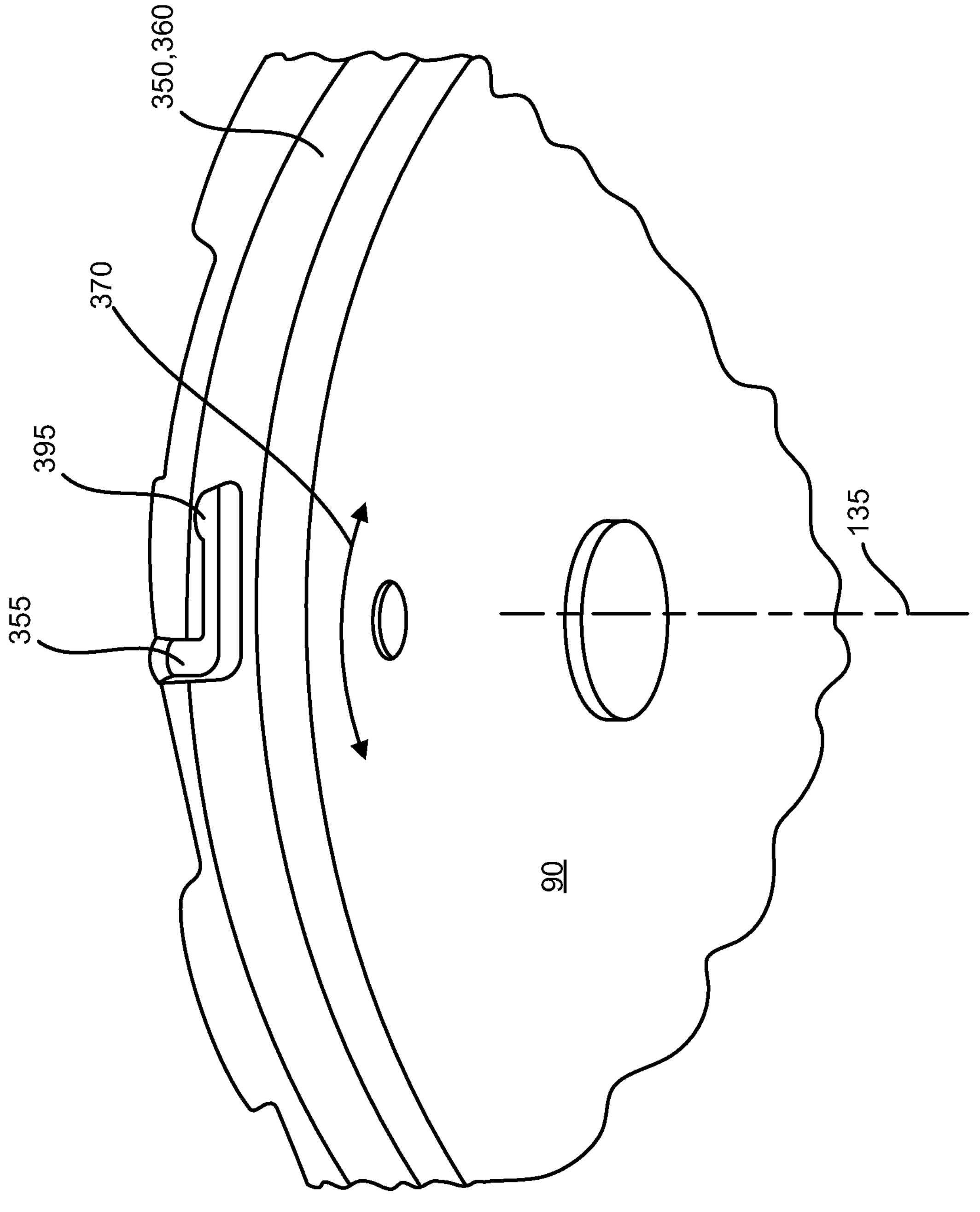
FIG. 16 shows a perspective view of the receiving cavity and twist lock engagement along with the stepped recess and radial pilot fit of the core structure.

Next, FIG. 16 shows a perspective view of the receiving cavity 355 and twist lock engagement 395 along with the stepped recess 350 and radial pilot fit 360 of the core structure 90.

Figure 17:
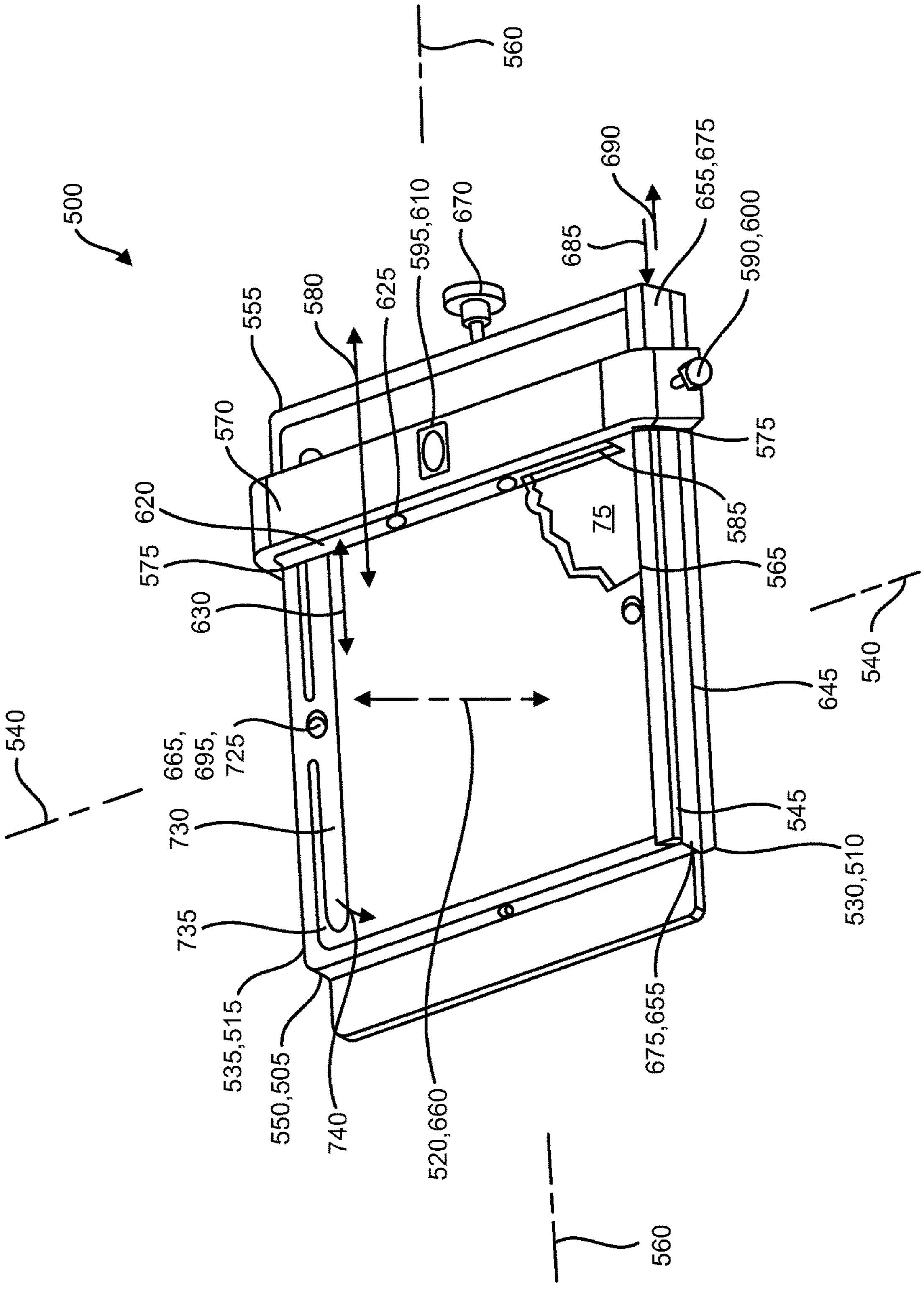
FIG. 17 is an upper perspective view of the tray apparatus that includes a base planar structure, first and second sides, first and second margins, first and second boundaries, a fence, plus a sliding bridge structure with a plate, showing a portion of the article supported by the base second side, and resting as against the fence and the plate.

Further, FIG. 17 is an upper perspective view of a tray apparatus 500 that includes a base planar structure 505, first 510 and second 515 sides, first 530 and second 535 margins, first 550 and second 555 boundaries, a fence 545, plus a sliding bridge structure 570 with a plate 620, showing a portion of the article 75 supported by the base 505 second side 515, and retaining/resting 565, 585 as against the fence 545 and the plate 620.

Figure 18:
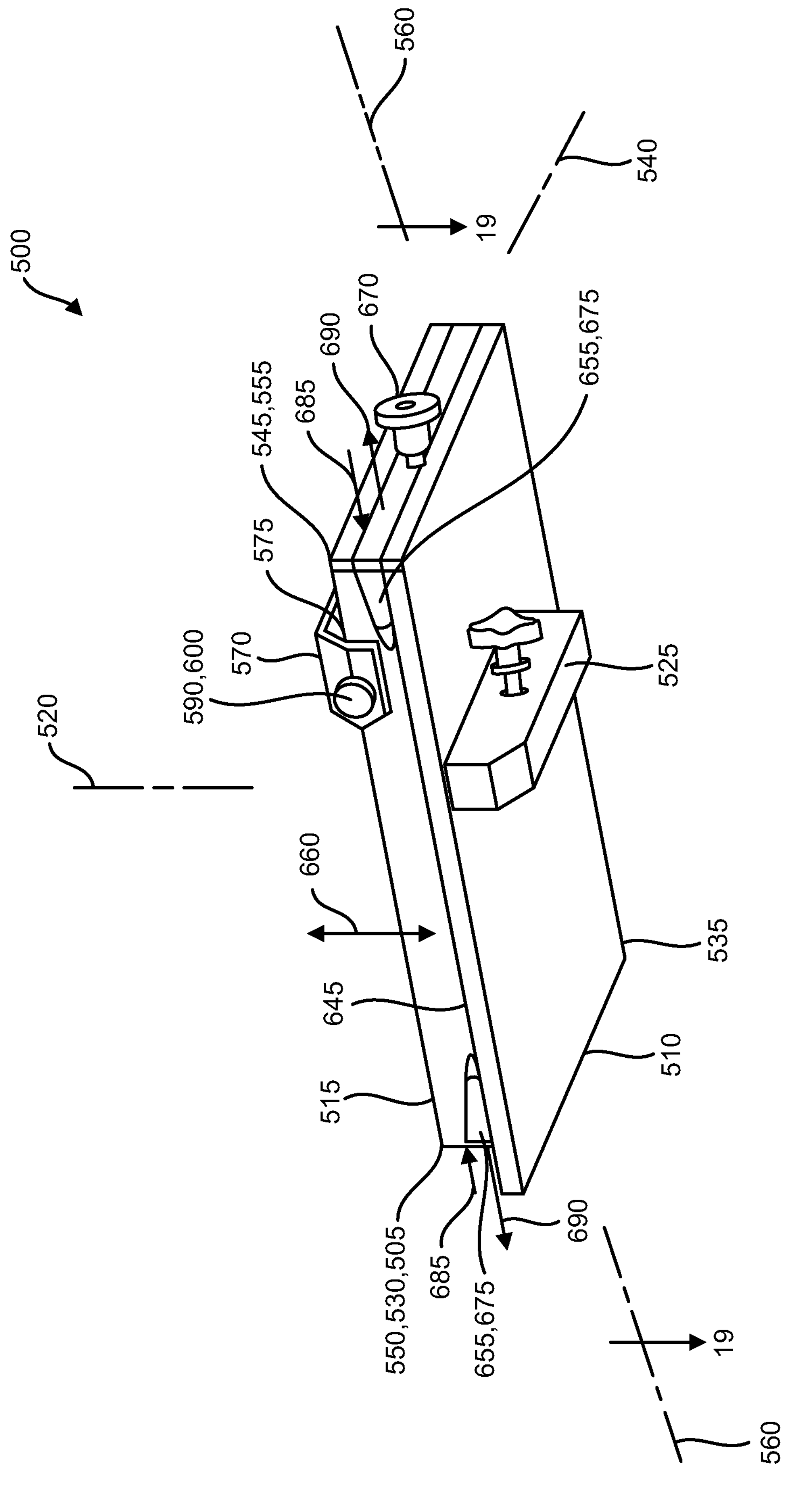
FIG. 18 is an lower perspective view of the tray apparatus that includes the base planar structure, the first and second sides, the first and second margins, the first and second boundaries, the fence, plus the sliding bridge structure, plus structure adapted to attach the first side portion to the table saw table.

Moving onward, FIG. 18 is an lower perspective view of the tray apparatus 500 that includes the base planar structure 505, the first 510 and second 515 sides, the first 530 and second 535 margins, the first 550 and second 555 boundaries, the fence 545, plus the sliding bridge structure 570, plus structure adapted to attach 525 the first side portion 510 to the table saw 55 table 60.

Figure 19:
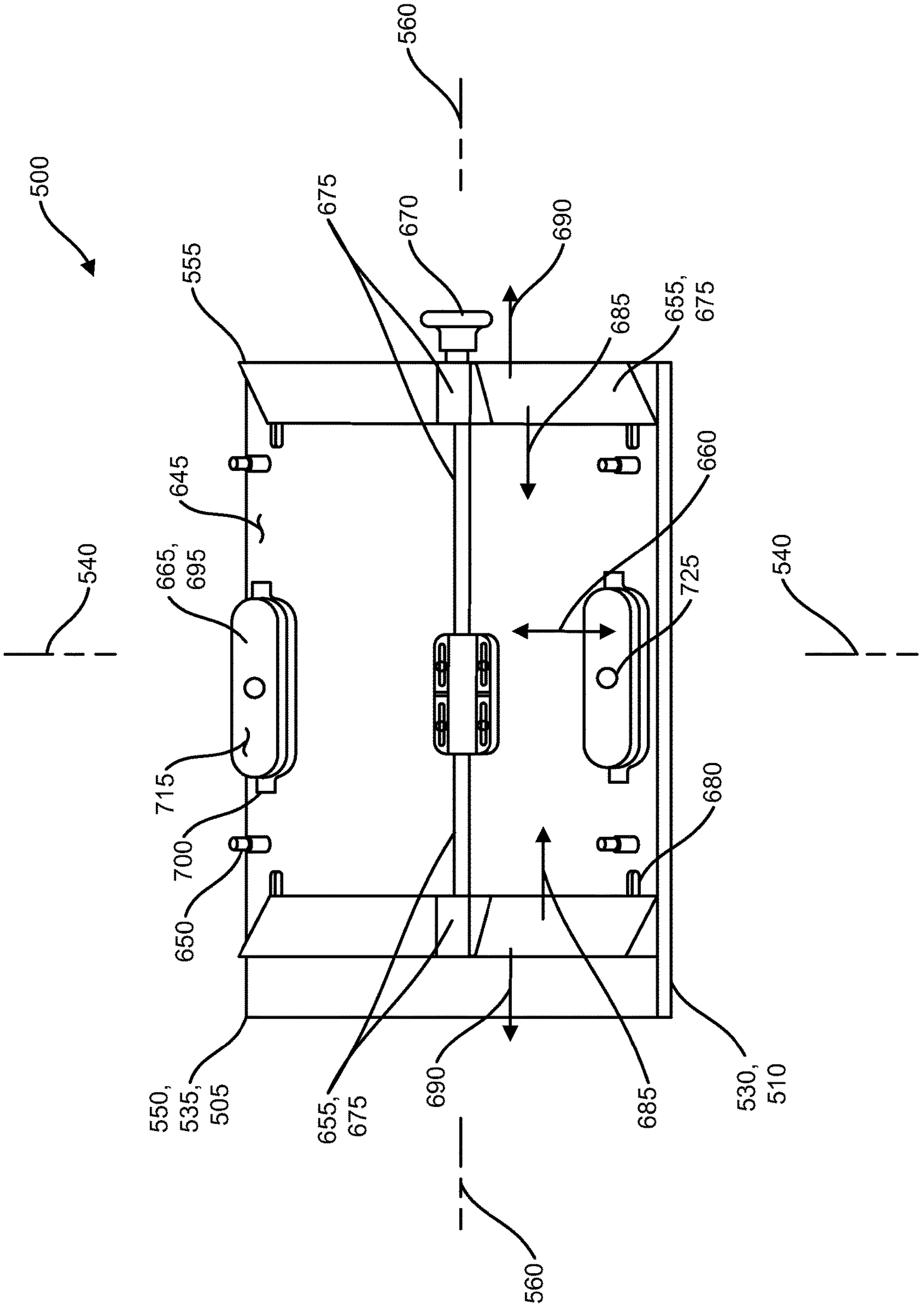

Continuing, FIG. 19 is cross section cut 19-19 from FIG. 18, wherein FIG. 19 shows the first side portion 510 with primarily a third means 655 for coarse adjustment of the second side portion 515 in relation to the first side portion 510 with a threaded rod second wedge cam 675 with an alignment slot 680, plus a forth means 665 for fine adjustment of the second slidable movement 660 in the form of a jack block assembly 695 with a housing 715, and jack screw shown 725.

Figure 20:
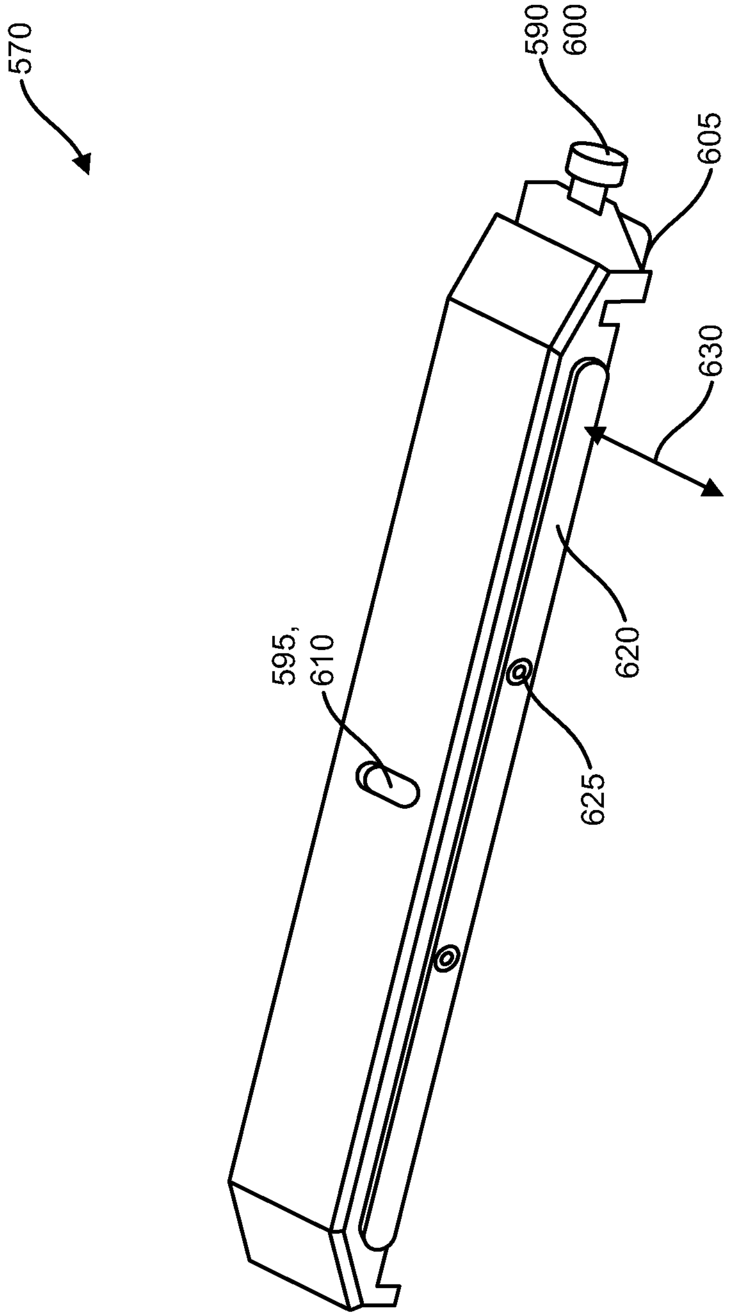
FIG. 20 is an upper perspective view of the sliding bridge structure with the plate, guide pins, plus a first means for coarse adjustment with a first threaded thumb knob, and a clamp structure, and a second means for fine adjustment of the first slidable movement with a second thumb knob shown.

Next, FIG. 20 is an upper perspective view of the sliding bridge structure 570 with the plate 620, first guide pins 625, plus a first means 590 for coarse adjustment with a first threaded thumb knob 600, and a clamp structure 605, and a second means 595 for fine adjustment of the first slidable movement 580 with a second thumb knob 610 shown.

Figure 21:
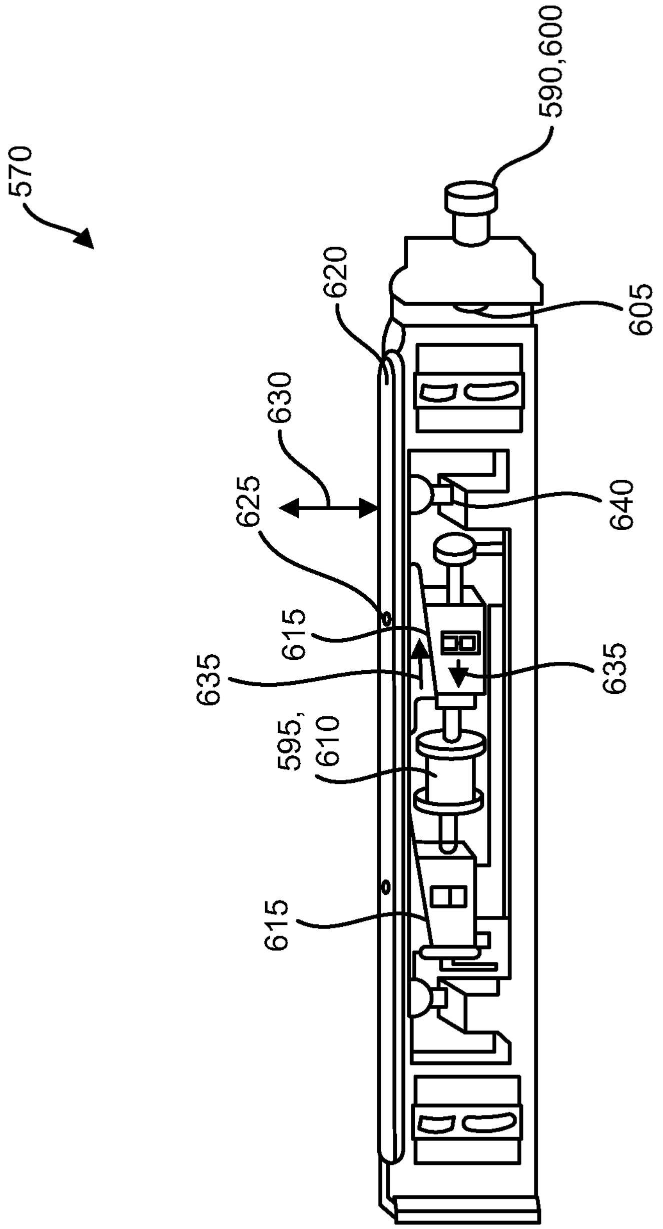
FIG. 21 is a lower perspective view of the sliding bridge structure with the plate, guide pins, plus the first means for coarse adjustment with the first threaded thumb knob, and the clamp structure, and the second means for fine adjustment of the first slidable movement with the second thumb knob shown and a threaded rod first wedge cam, with the threaded rod first wedge cam selectably drawn together for X axis micro movement, and the first spring.

Further, FIG. 21 is a lower perspective view of the sliding bridge structure 570 with the plate 620, first guide pins 625, plus the first means 590 for coarse adjustment with the first threaded thumb knob 600, and the clamp structure 605, and the second means 595 for fine adjustment of the first slidable movement 580 with the second thumb knob 610 shown and a threaded rod first wedge cam 615, with the threaded rod first wedge cam 615 selectably drawn together 635 for X axis 560 micro movement 630, and the first spring 640.

Figure 22:
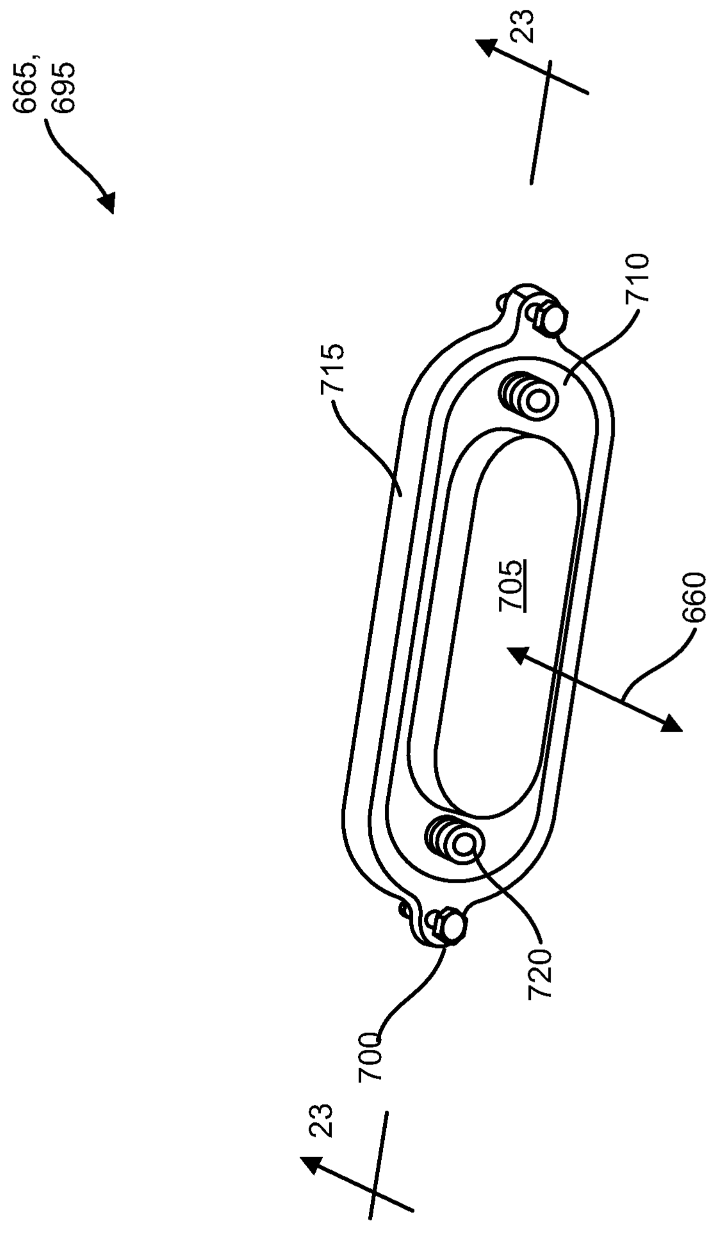
FIG. 22 shows a perspective view of the forth means for fine adjustment of the second slidable movement in the form of the jack block assembly that includes the housing, a slide block, return spring, and an affixment for the housing to the first side portion of the base.

Continuing, FIG. 22 shows a perspective view of the forth means 665 for fine adjustment of the second slidable movement 660 in the form of the jack block assembly 695 that includes the housing 715, a slide block 705, return second spring 720, and an affixment 700 for the housing 715 to the first side portion 510 of the base 505.

Figure 23:
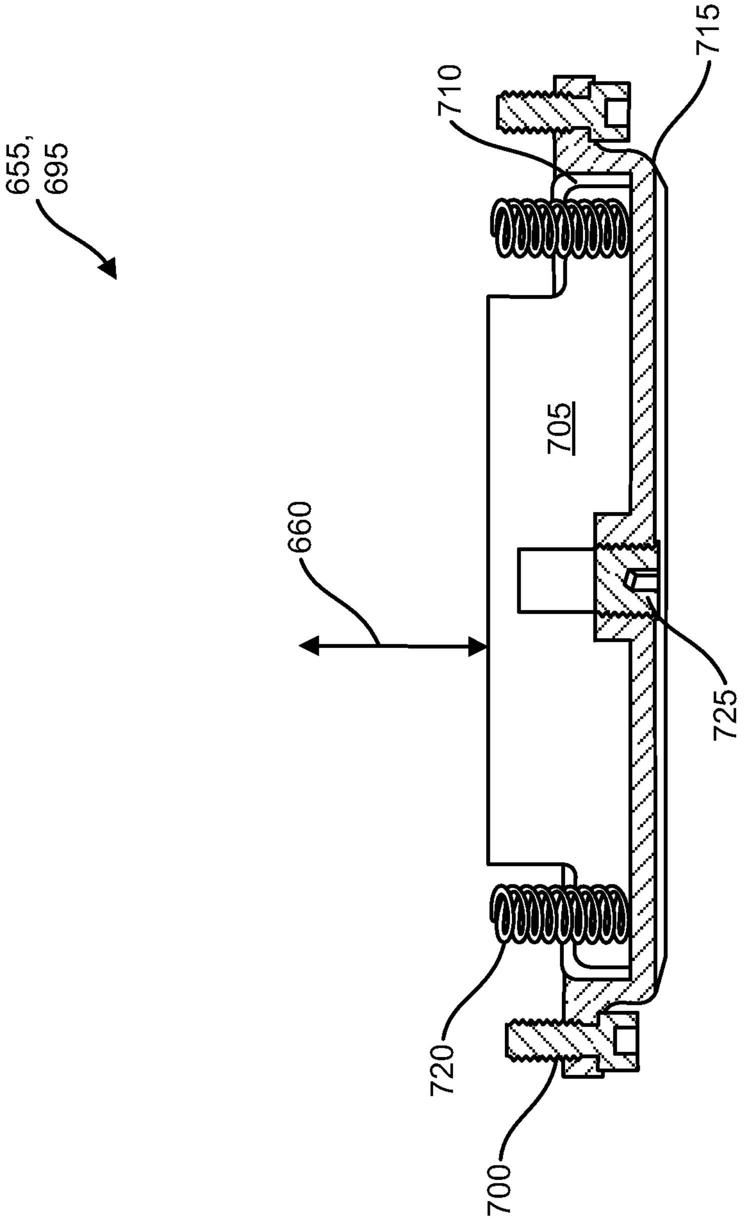

Next, FIG. 23 is cross section cut 23-23 from FIG. 22, wherein FIG. 23 shows a cross sectional view of the forth means 665 for fine adjustment of the second slidable movement 660 in the form of the jack block assembly 695 that includes the housing 715, the slide block 705, return second spring 720, and the affixment 700 for the housing 715 to the first side portion 510 of the base 505.

Figure 24:
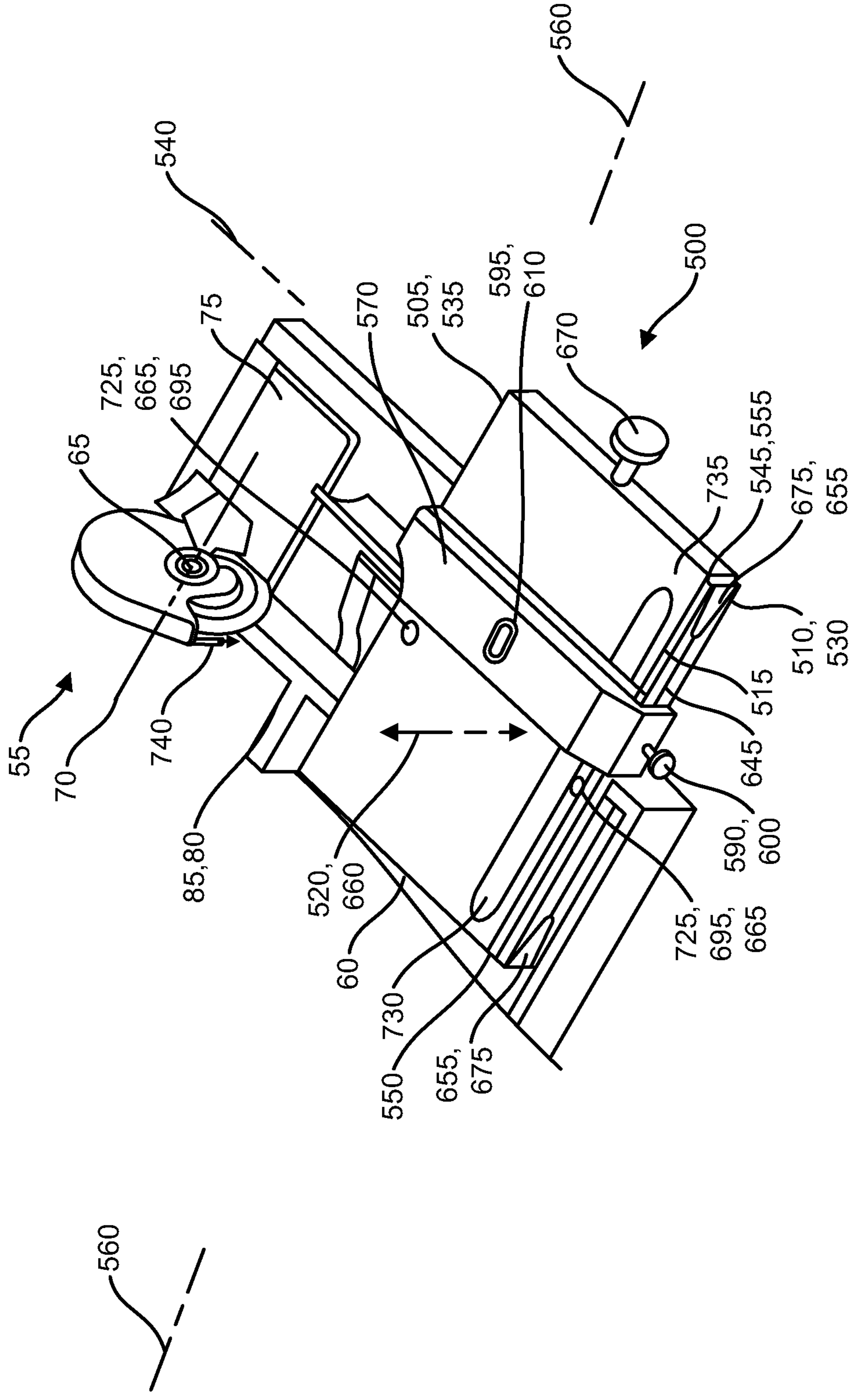
FIG. 24 is an upper perspective use/installed view of the tray apparatus upon the table saw table with the article removed from the base planar structure for pictorial clarity, wherein the tray apparatus includes the base planar structure, the first and second sides, the first and second margins, the first and second boundaries, the fence, plus the sliding bridge structure, however, showing the article in its positional relationship to the saw.

Moving ahead, FIG. 24 is an upper perspective use/installed view of the tray apparatus 500 upon the table saw 55 table 60 with the article 75 removed from the base planar structure 505 for pictorial clarity, wherein the tray apparatus 500 includes the base planar structure 505, the first 510 and second 515 sides, the first 530 and second 535 margins, the first 550 and second 555 boundaries, the fence 545, plus the sliding bridge structure 570, however, showing the article 75 in its positional relationship to the saw 55.

Broadly in referring to FIGS. 1 to 7, and 12, the present invention is a material trimming system 50 adapted to attach to a table saw 55 having a rotationally driven arbor 65, a table 60, and an article 75 placed on the table 60 to be trimmed 80, 85, 190, the material trimming system 50 including a core structure 90 that is about a core rotational axis 95 wherein the core structure 90 is adapted to attach 100 to the arbor 65 that is about an arbor rotational axis 70 of the table saw 55, wherein the core rotational axis 95 and the arbor rotational axis 70 are coincident 105 to one another, as best shown in FIGS. 1 to 5. Further included in the material trimming system 50 is a peripheral ring 110 that is about a ring rotational axis 115, wherein the peripheral ring 110 removably engages 120 the core structure 90, wherein the peripheral ring 110 includes an outer peripheral element 125 that is operational to trim a material 80, 85, 190 of the article 75 to a selected configuration, see FIG. 12 for the trimming 80, 85, 190, plus FIGS. 2, 3, 4, and 7. In addition, included in the material trimming system 50 is a cover 130 having a cover rotational axis 135, the cover 130 having a mechanism 140 to be removably attachable to the core structure 90 that is operational to removably retain the peripheral ring 110 to the core structure 90, wherein the core 95, ring 115, and cover 135 rotational axes are all coincident 145 to one another, as best shown in FIGS. 1 to 5, plus FIG. 12.

As an option on the material trimming system 50 concerning the peripheral ring 110 can be constructed from an inner hoop 150 made of a first material 155 that has consistent strength characteristics for having a rotational engagement 160 to the core structure 90 to withstand torsional 165, rotational 170, and axial 175 stress loading, further the peripheral ring 110 outer peripheral element 125 includes an outer band 180 constructed of a second material 185 that has characteristics to cut, grind, or polish 190 the article 75, as best shown in FIGS. 7 and 12, see also FIGS. 6 and 10.

Further, optionally for the material trimming system 50 an interface 195 can be formed as between the first 155 and second 185 materials that is constructed of a cantilevered shoulder 200 extending radially outward 205 in a terminating peripheral manner 210 from the inner hoop 150 first material 155 such that the outer band 180 second material 185 encompasses 215 the shoulder 200 to operationally reduce the torsional 165, rotational 170, and axial 175 stress loading as imparted on the second material 185, see in particular FIGS. 6 and 7, plus also FIGS. 4, 10, and 12.

Alternatively for the material trimming system further in reference to the shoulder 200 can be further constructed of an inner proximal end portion 220 and a opposing outer distal end portion 225 wherein the inner proximal end portion 220 is a widened cantilever root 230 extending radially outward 235 toward a thinner 240 terminating distal end portion 225 free end wherein the second material 185 is molded 245 about the cantilevered shoulder 200, see in particular FIGS. 6 to 10.

Also alternatively for the material trimming system 50 wherein the cantilevered shoulder 200 further comprises an aperture 250 therethrough wherein the aperture 250 is about an aperture axis 255 that is positioned substantially parallel 260 to the ring 110 rotational axis 115, wherein the aperture 250 is disposed between the proximal 220 and distal 225 portions, wherein the second material 185 molding 265 is disposed therethrough the aperture 250 to operationally further reduce the torsional 165, rotational 170, and axial 175 stress loading on the second material 185, as best shown in FIGS. 6 and 7, plus FIGS. 8 to 10, and FIG. 12.

Another alternative for the material trimming system 50 can further comprise a plurality of the apertures 250 circumferentially spaced apart 270 in an equidistant manner to operationally further again reduce the torsional 165, rotational 170, and axial 175 stress loading on the second material 185, again as best shown in FIGS. 6 and 7, plus FIGS. 8 to 10, and FIG. 12.

Yet another alternative for the material trimming system 50 wherein the core structure 90 can further comprise a thrust disc 275 having a thrust disc rotational axis 280, the thrust disc 275 is structurally rotationally engaged 285 to the core 90 wherein positionally the thrust disc 280 and core 95 rotational axes are coincident 290 to one another, the thrust disc 275 terminates radially in an outer perimeter margin 295, see FIGS. 3, 4, and 5, plus FIG. 12. Wherein the outer perimeter margin 295 has a potential contact 305 with a ridge section 300 secured upon the table saw 55 table 60, wherein operationally the thrust disc 275 can absorb axial thrust force 310 that is along the thrust disc 275 rotational axis 280 from the core structure 90 coming from the peripheral ring 110 as a result of the trimming 80, 85, 190 of the article 75, again see FIGS. 3, 4, and 5, plus FIG. 12.

Continuing on alternatives for the material trimming system 50 wherein the outer perimeter margin 295 can be formed from a thrust disc inclined surface 315 that forms a thrust disc acute angle 320 with the thrust disc 275 rotational axis 280 such that the outer perimeter margin 295 increases in distance 325 from the thrust disc 275 rotational axis 280 in moving toward the outer peripheral element 125 in an axial manner, further the ridge section 300 is formed from a ridge section inclined surface 330 that matches the angle on the thrust disc 275 inclined surface 315 acute angle 320 with the ridge section 300 inclined surface 330 being a greater distance than the thrust disc 275 inclined surface 315 along the thrust disc 275 rotational axis 280, see in particular FIGS. 3 and 12, plus FIGS. 4, 5, and 11. This is to operationally have the thrust disc 275 inclined surface 315 wedge 335 against the ridge section 300 inclined surface 330 to provide rigidity from the saw 55 table 60 in two axes to the thrust disc 275 being the axial thrust force 310 and a radial force 340 emanating outward from the thrust disc 275 rotational axis 280 to ultimately provide rigidity to the material trimming system 50 needed from loads generated by the trimming of material 80, 85, 190 from the article 75, again see in particular FIGS. 3 and 12, plus FIGS. 4, 5, and 11. Further optionally for the material trimming system 50 wherein the thrust disc 275 structural rotational engagement 285 to the core 90 is preferably constructed of a ball bearing 345, as best shown in FIGS. 4 and 5.

Continuing on alternatives for the material trimming system 50 wherein the removable attachable mechanism 140 as between the cover 130 and the core structure 90 is constructed of a pair of receiving cavities 355 disposed within a portion of the stepped recess 350 within the core structure 90, with the cover 130 having a radial pilot fit 360 to the stepped recess 350 to position the cover rotational axis 135 and the core rotational axis 95 in the coincident manner 145, further the cover 130 also includes a pair of radially positioned outward axially urged 390 pins 415. Wherein the pins 415 each have a twist lock engagement 395 with a respective one the pair of receiving cavities 355 via the axially urging 390 to removably engage the cover 130 to the core structure 90, wherein the cover 130 further includes an outer flange 400 that axially retains the peripheral ring 110 to the core structure 90, see in particular FIGS. 13 to 16, plus FIGS. 1, 2, 4, and 5.

Looking at FIGS. 17 to 24 in particular the tray apparatus 500 is adapted to attach 525 to a table saw 55 having a rotationally driven arbor 65, a table 60, and an article 75 placed on the tray apparatus 500, wherein the article 75 is to be trimmed by the table saw 55, the tray apparatus 500 includes the base planar structure 505 having the first side portion 510 and the opposing second side portion 515 with the Z axis 520 spanning therebetween, see in particular FIGS. 17 and 18. Wherein the first side portion 510 is adapted to attach 525 to the table saw 55 table 60, the base planar structure 505 further includes the first margin 530 and the opposing second margin 535 with a Y axis 540 spanning therebetween, see FIGS. 18 and 24. Wherein the first margin 530 further includes the fence barrier 545 to operationally help retain the article 75 in the Y axis 540 and the second side 515 operationally providing a support for the article 75 in the Z axis 520, the base planar structure 505 also further includes the first boundary 550 and the opposing second boundary 555 with the X axis 560 spanning therebetween, as best shown in FIG. 17.

Further included in the tray apparatus 500 is the sliding bridge structure 570 suspended over the second side portion 515, wherein the sliding bridge structure 570 is slidably engaged 575 to the first 530 and second 535 margins, the sliding bridge structure 570 having the first slidable movement 580 along the X axis 560, the sliding bridge structure 570 operationally providing a rest 585 for the article 75 in the X axis 560, see FIG. 17 in particular and FIGS. 20 and 21.

Optionally, for the tray apparatus 500, the sliding bridge structure 570 can further include the first means 590 for coarse adjustment of the first slidable movement 580 and the second means 595 for fine adjustment of the first slidable movement 580, see in particular FIGS. 20 and 21, plus FIGS. 17 and 18.

Another option, for the tray apparatus 500 is that the first means 590 for coarse adjustment is preferably constructed of the first threaded thumb knob 600 with the clamp structure 605 on the first margin 530 that operationally facilitates locking the first slidable movement 580, see in particular FIGS. 20 and 21, plus FIGS. 17 and 18.

A further option for the tray apparatus 500 wherein the second means 595 for fine adjustment is constructed of the second thumb knob 610 threaded rod first wedge cam 615 affixed to the first guide pin 625 guided moving plate 620, wherein the plate 620 has selectable micro movement 630 along the X axis 560, operationally the plate 620 moves away from the sliding bridge structure 570 when the first wedge cam 615 is selectably drawn together 635 with the second thumb knob 610, also the second means 595 for fine adjustment also includes the first spring 640 to bias the plate 620 toward the sliding bridge structure 570 to operationally give the plate 620 consistent movement 630 away from and toward the sliding bridge structure 570, see in particular FIGS. 20 and 21, plus FIGS. 17 and 18.

Alternatively, for the tray apparatus 500 the planar structure 505 can include the separating interface 645 disposed as between the first 510 and second 515 side portions, with the first 510 and second 515 side portions having the second guide pin 650 disposed therebetween, wherein the interface 645 further includes the third means 655 for coarse adjustment of the second side portion 515 in relation to said first side portion 510 for the second side portion 515 having the second slidable movement 660 along the Z axis 520 and a fourth means 665 for fine adjustment of the second slidable movement 660, see in particular FIG. 19, also FIGS. 17, 18, and 24.

Also alternatively, for the tray apparatus 500 wherein the third means 665 for coarse adjustment is constructed of the third thumb knob 670 threaded rod second wedge cam 675 with an alignment slot 680 disposed in the first side portion 510, wherein operationally as the second wedge 675 is selectably drawn together 685 via the third thumb knob 670 thus resulting in the second side portion 515 moving away from the first side portion 510, wherein operationally the first side portion 510 moves toward the second side portion 515 in the second slidable movement 660 due to the second wedge cam 675 being selectively pushed apart 690 via the third thumb knob 670 and weight of the second side portion 151, see in particular FIG. 19, also FIGS. 17, 18, and 24.

A further alternative for the tray apparatus 500 wherein the fourth means 665 for fine adjustment of the second slidable movement 660 is preferably constructed of the jack block assembly 695 that is disposed in the separating interface 645 and affixed 700 to the first side portion 510, the jack block assembly 695 is constructed of the slide block 705 partially slidably engaged 710 to the housing 715 affixed 700 to the first side portion 510, see in particular FIG. 19. Also a jack screw 725 disposed between the slide block 705 and the housing 715, see FIG. 23, also see FIGS. 17 and 19, wherein operationally the jack screw 725 selectively moves the slide block 705 and the housing 715 apart 660 from one another to fine tune the base planar structure 505 second slidable movement 660 along the Z axis 520 to accommodate variance in the article 75 size, further included in the jack block assembly 695 is the second spring 720 to bias the slide block 705 toward the housing 715 for return movement 660 of the slide block 705 and the housing 715 opposite to the jackscrew 725 movement, as best shown in FIGS. 22 and 23, plus FIGS. 17 and 19.

In addition alternatively, for the tray apparatus 500, wherein the second side portion 515 further includes the plurality of plateaus 730 with the continuous channel 735 disposed adjacent to the plateaus 730, wherein operationally the plateaus 730 support the article 75 and the channel 735 diverts a saw cooling fluid 740 away from the article 75, as best shown in FIGS. 17 and 24.

CONCLUSION

Accordingly, the present invention of the material trimming system including the tray apparatus has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A material trimming system adapted to attach to a table saw having a rotationally driven arbor, a table, and an article placed on the table to be trimmed, said material trimming system comprising:

(a) a core structure that is about a core rotational axis wherein said core structure is adapted to attach to the arbor that is about an arbor rotational axis of the table saw, wherein said core rotational axis and the arbor rotational axis are coincident to one another;

(b) a peripheral ring that is about a ring rotational axis, wherein said peripheral ring removably engages said core structure, wherein said peripheral ring includes an outer peripheral element that is operational to trim a material of the article to a selected configuration, said peripheral ring is constructed from an inner hoop made of a first material that has consistent strength characteristics for having a rotational engagement to said core structure to withstand torsional, rotational, and axial stress loading, further said peripheral ring outer peripheral element includes an outer band constructed of a second material that has characteristics to cut, grind, or polish the article, wherein an interface is formed as between said first and second materials that is constructed of a cantilevered shoulder extending radially outward in a terminating peripheral manner from said inner hoop first material such that said outer band second material encompasses said shoulder to operationally reduce said torsional, rotational, and axial stress loading as imparted on said second material; and (c) a cover having a cover rotational axis, said cover having a mechanism to be removably attachable to said core structure that is operational to removably retain said peripheral ring to said core structure, wherein said core, ring, and cover rotational axes are all coincident to one another.

2. A material trimming system according to claim 1 wherein said shoulder is further constructed of an inner proximal end portion and an opposing outer distal end portion wherein said inner proximal end portion is a widened cantilever root extending radially outward toward a thinner terminating distal end portion free end wherein said second material is molded about said cantilevered shoulder.

3. A material trimming system according to claim 2 wherein said cantilevered shoulder further comprises an aperture therethrough wherein said aperture is about an aperture axis that is positioned substantially parallel to said ring rotational axis, wherein said aperture is disposed between said proximal and distal portions, wherein said second material molding is disposed therethrough said aperture to operationally further reduce said torsional, rotational, and axial stress loading on said second material.

4. A material trimming system according to claim 3 further comprising a plurality of said apertures circumferentially spaced apart in an equidistant manner to operationally further again reduce said torsional, rotational, and axial stress loading on said second material.

5. A material trimming system according to claim 1 wherein said core structure further comprises a thrust disc having a thrust disc rotational axis, said thrust disc is structurally rotationally engaged to said core wherein positionally said thrust disc and core rotational axes are coincident to one another, said thrust disc terminates radially in an outer perimeter margin, wherein said outer perimeter margin has a potential contact with a ridge section secured upon the table saw table, wherein operationally said thrust disc can absorb axial thrust force that is along said thrust disc rotational axis from said core structure coming from said peripheral ring as a result of said trimming of the article.

6. A material trimming system according to claim 5 wherein said outer perimeter margin is formed from a thrust disc inclined surface that forms a thrust disc acute angle with said thrust disc rotational axis such that said outer perimeter margin increases in distance from said thrust disc rotational axis in moving toward said outer peripheral element, further said ridge section is formed from a ridge section inclined surface that matches said angle on said thrust disc inclined surface acute angle with said ridge section inclined surface being a greater distance than said thrust disc inclined surface along said thrust disc rotational axis to operationally have said thrust disc inclined surface wedge against said ridge section inclined surface to provide rigidity from the saw table in two axes to said thrust disc being said axial thrust force and a radial force emanating outward from said thrust disc rotational axis to ultimately provide rigidity to said material trimming system needed from loads generated by said trimming material from the article.

7. A material trimming system according to claim 5 wherein said thrust disc structural rotational engagement to said core is constructed of a ball bearing.

8. A material trimming system according to claim 1 wherein said removable attachable mechanism as between said cover and said core structure is constructed of a pair of receiving cavities disposed within a portion of a stepped recess within said core structure, with said cover having a radial pilot fit to said stepped recess to position said cover rotational axis and said core rotational axis in said coincident manner, further said cover also includes a pair of radially positioned outward axially urged pins, wherein said pins have each a twist lock engagement with a respective one said pair of receiving cavities via said axially urging to removably engage said cover to said core structure, wherein said cover further includes an outer flange that axially retains said peripheral ring to said core structure.

* * * * *